United States Patent
Küpper et al.

(10) Patent No.: US 6,411,879 B2
(45) Date of Patent: Jun. 25, 2002

(54) MOTOR VEHICLE WITH A DEVICE THAT RECOGNIZES AN INTENTION TO SHIFT GEAR

(75) Inventors: Klaus Küpper, Bühl; Michael Salecker, Stuttgart/Sonnenberg, both of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/849,769

(22) Filed: May 3, 2001

Related U.S. Application Data

(63) Continuation of application No. PCT/DE99/03490, filed on Dec. 28, 1999.

(30) Foreign Application Priority Data

Nov. 3, 1998 (DE) .......................... 198 50 512

(51) Int. Cl.$^7$ .......................... G60F 17/00; G60F 19/00
(52) U.S. Cl. .......................... 701/51; 180/337; 477/34; 477/107
(58) Field of Search .......................... 701/51; 180/337, 180/338, 347; 477/34, 107, 111, 115; 74/640

(56) References Cited

U.S. PATENT DOCUMENTS

| | | | |
|---|---|---|---|
| 5,780,979 A | * 7/1998 | Kim | 180/338 |
| 5,875,679 A | * 3/1999 | Salecker et al. | 74/335 |
| 5,951,436 A | * 9/1999 | Kim | 477/20 |
| 5,957,805 A | * 9/1999 | Salecker et al. | 477/74 |
| 6,073,509 A | * 6/2000 | Salecker et al. | 74/335 |
| 6,209,408 B1 | * 4/2001 | DeJonge et al. | 74/335 |
| 6,322,477 B1 | * 11/2001 | Eich et al. | 477/46 |

FOREIGN PATENT DOCUMENTS

| | | |
|---|---|---|
| DE | 40 13 299 A | 11/1990 |
| DE | 195 04 847 A | 9/1995 |
| DE | 196 50 450 1 A1 | 9/1997 |
| DE | 197 34 038 A1 | 2/1998 |
| GB | 2319817 A | 3/1998 |
| WO | WO 96 20363 A | 7/1996 |
| WO | WO 99 01312 A | 1/1999 |

* cited by examiner

Primary Examiner—William A. Cuchlinski, Jr.
Assistant Examiner—Olga Hernandez
(74) Attorney, Agent, or Firm—Darby & Darby

(57) ABSTRACT

A motor vehicle (201) has an engine (201), a clutch (203), and a transmission (204) with a shift lever (230). A sensor (232) arranged at the shift lever (230) detects movements of the shift lever or forces applied to the shift lever. When the sensor (232) detects a movement or force, the activity is interpreted as a signal that the driver intends to shift gear. A detector system of the motor vehicle detects conditions such as the presence and magnitude of a mechanical play which can affect the process of shifting gears in the transmission (204).

153 Claims, 4 Drawing Sheets

MOTOR VEHICLE WITH A DEVICE THAT RECOGNIZES AN INTENTION TO SHIFT GEAR

This is a continuation of international application Ser. No. PCT/DE99/03490 filed Oct. 28, 1999, the entire disclosure of which is hereby incorporated by reference.

BACKGROUND OF THE INVENTION

The invention relates to a motor vehicle equipped with a device that detects when the driver of a motor vehicle is about to shift gear; and it further relates to a method of detecting when a gear shift is about to occur.

Motor vehicles with a device for detecting a driver's intention to shift gear are known from DE 197 34 038 A1. The device according to the aforementioned publication is based on a sensor that is arranged at the actuating linkage of the transmission. When the sensor detects a move to change the position of the actuating linkage, the activity is interpreted as a signal that the driver intends to shift gear, whereupon the signal is forwarded to a clutch control device. After the driver's intent to shift gear has been recognized, the clutch control device issues a control command for the clutch to be taken out of engagement.

This known device is especially appropriate for motor vehicles without a clutch pedal, where the driver initiates a gear change in the transmission only through a shift lever.

A motor vehicle with a device for detecting a driver's intention to shift gear is further known from DE 195 04 847.1, which describes a device that detects the magnitude of a change in the shift lever position and generates a shift lever signal of proportionate magnitude as the change in the shift lever position. The shift lever signal is processed through a digital/analog filter with a time lag, so that the filtered signal comes out as a linearized signal with a time delay in relation to the movement of the shift lever. A reference level for the filtered signal is generated by combining a constant value with an offset signal that depends on the magnitude of a torque in the power train of the vehicle. As soon as there is a cross-over in a real-time comparison between the shift signal and the reference signal, a shift-intent counter is set to start counting up from zero. The shift-intent counter runs up to a defined reference count at a speed that depends on the clock frequency of the control unit. As soon as the shift-intent counter has reached the reference value, it sends a shift-intent signal to an actuator system. While the shift-intent counter is incrementing from zero towards the reference value, the count can be stopped and reset to zero, if a control signal based on the driving torque, the torque load on the power train, and the further movement of the shift lever indicates that the driver no longer intends to shift gear.

With the device of the foregoing description, an intention to shift gear can be detected at a relatively early stage.

Nevertheless, in certain situations, the device of the foregoing description could benefit from improvements with respect to its accuracy and responsiveness. In particular, it would be desirable to give more weight to operational, vehicle-specific, and situational parameters in the detection of an intent to shift gear.

OBJECT OF THE INVENTION

The object of the present invention is to provide a vehicle with a capability to detect when a driver intends to shift gear through a concept that is cost-effective, uncomplicated to realize, detects an incipient gear shift promptly and reliably, takes vehicle-specific and operational parameters into account, and responds to each shift situation in an optimally adapted manner.

SUMMARY OF THE INVENTION

The present invention meets the foregoing objective in a motor vehicle with at least one drive source and at least one output device in its power train, and at least one transmission device arranged in the power train between the drive source and the output device. The transmission device converts a transmission input quantity into a transmission output quantity and is operable to shift gear, i.e., to change the transmission from one to another of at least two different gear levels with different ratios between an input quantity and an output quantity of the transmission. At least one actuating device is used to actuate the shifting of the transmission device. The vehicle is equipped with at least one detecting device (herein referred to as an intent-to-shift detecting device) that is responsive to conditions or activities indicating that the driver of the vehicle intends to shift gear. The vehicle further has at least one detector system to monitor one or more vehicle components for the presence of performance-affecting conditions that have an influence on the shifting of the transmission device.

Such performance-affecting conditions can be caused, e.g., by production-related or wear-related variances of a component, and are characterized by associated operating parameters of the vehicle. Typically, the intent-to-shift detecting device generates a signal when an intent to shift gear has been detected. In a preferred embodiment of the present invention, the motor vehicle is equipped with one or more adaptation devices to adapt the intent-to-shift signal to the performance-affecting condition.

The scope of the present invention also encompasses a method of detecting a driver's intent to shift gear in a motor vehicle with one or more transmission devices and one or more shifting devices. With the inventive method, the intent to shift is detected in accordance with a set of detection characteristics, where a degree of mechanical play in the transmission device and/or the shifting device is taken into account to an at least partial extent.

Thus, the invention provides that a motor vehicle be equipped with one or more transmission devices, one or more actuating devices for the transmission device, at least one intent-to-shift detection device, as well as at least one detector system to detect conditions which may be related to vehicle components and/or to a signal indicating an intent to shift gear and/or to a signal from the shift lever, and/or to the function of the shift lever.

The motor vehicle has a drive source such as any kind of motor, e.g., an electric motor, or a combustion engine. The drive source generates a mechanical drive quantity which may be, for example, of an electrical or mechanical nature, such as a torque.

An output device of the motor vehicle serves to produce one or more output quantities, such as for example a mechanical output quantity, specifically a torque acting on the drive wheels of the motor vehicle.

The transmission device serves to convert a transmission input quantity into a transmission output quantity. For example, a torque of a transmission input shaft may be converted into a torque of a transmission output shaft. Preferably, the transmission has a neutral position, in which a torque at the input shaft does not result in a torque on the output shaft, and vice versa. With particular preference, the transmission device has different shift levels, commonly referred to as different gears, gear levels, etc. The shift levels or gear levels are distinguished in that each produces a different transmission ratio, i.e., a different ratio between the respective rpm rates of the transmission input shaft and the transmission output shaft.

A particularly preferred kind of transmission is a gear-shifting transmission, where discrete gear levels are clearly defined and are shifted in stepwise sequence.

According to a further preferred embodiment of the invention, the transmission device is configured at least in part as a step-less transmission, in which the transmission ratio has a continuous rather range of variation rather than discrete steps.

It is also preferred if the transmission is at least in part an automatic transmission or an automated gear-shifting transmission.

A vehicle according to a preferred embodiment of the invention is equipped with a torque-transmitting device such as, e.g., a clutch.

Also among preferred concepts of the invention are configurations of the torque-transmitting device with or without a power-branching arrangement.

In place of, or in addition to, a clutch, the torque transmitting device may also include a torque-converter device.

In accordance with a preferred embodiment of the invention, the torque-transmitting device is arranged in the torque flow path between the drive source and the transmission device.

In an alternative preferred embodiment, the transmission device is arranged in the torque flow path between the drive source and the torque-transmitting device.

According to the invention, the intent-to-shift detecting device provides the capability of detecting an incipient shift activity of the shift lever or the transmission, i.e., a condition where a gear shift is about to occur and/or has just been initiated.

The inventive concept also provides for the detection of extraneous influences and interference factors that affect the gear-shifting functions of the actuating device and/or the shifting device and/or the transmission itself.

These extraneous influences or interference factors can be rooted in the design of vehicle components, in the shift signal, as well as in factors that have an influence on the shift signal. For example, such interference factors can be related to the design of the shift lever, the mounting arrangement of the shift lever, or a signal that either acts on or is generated by the shift lever. Material-related factors, too, such as for example the elasticity of the shift lever, can be picked up and taken into account by the detecting arrangement. By entering all of the acquired signal data into the intent-to-shift detection arrangement, the presence of an intent to shift gears can be established accurately and reliably.

The invention provides the benefit that it improves the accuracy, precision, reliability, as well as reproducibility in detecting the presence of an intent to shift gears. The intent-to-shift detection device is configured preferably as an intelligent controller device. In addition to the aforementioned benefits, it has a cost-effective design and does not require a large manufacturing investment. Furthermore, the device according to the invention reduces the incidence of erroneous data. Although the latter could be corrected after they have occurred, the correction would increase the data processing requirements. As a further benefit, the invention provides the possibility of a learning process whereby parameter data that are uniquely specific to an individual vehicle can be acquired with high accuracy and subsequently used to optimize the detection process specifically for an individual vehicle, as compared to a less advanced concept of adapting the parameter data only to the vehicle type.

The invention further proposes the concept of an adapting device. The latter allows at least one signal to be adapted to production-related and/or wear-related vehicle parameters. For example, the adapting device can be designed so that a signal sent into or out of the intent-to-shift detection device can be adapted to an appropriate parameter. In accordance with a preferred embodiment of the invention, a signal generated by the intent-to-shift detecting device, such as a reference signal, or an offset signal or constant value entering into the reference signal, can be adapted to a degree of play that is present in the shifting device and/or the transmission device and/or the shift-actuator shaft. For example, the offset signal or the constant value can be adapted to the degree of play found in the force-free positions of a shift lever.

In particular, the invention includes the concept of adapting the reference signal and/or the offset signal and/or the constant value to wear-related changes of vehicle parameters, such as a wear-related play of the shift lever—preferably in the force-free positions of the shift lever or the shift-actuator shaft. Thus, the invention provides for example that the offset signal and/or the constant value be determined also in function of the shift lever play. With particular preference, the correction or adjustment or adaptation of at least one of the aforementioned signals is made while the vehicle is in operation.

According to a further preferred embodiment of the invention, the actuating device includes a shifting device. The shifting device allows a shift signal or a shift lever signal to be directly or indirectly introduced and/or generated. For example, the shift signal can be transmitted through an intermediate device to the transmission, causing the latter to shift into a different position.

With preference, the shifting device is a shift lever or includes a shift lever. According to a particularly preferred embodiment, the lever or shifting device is manually operable. The term "manually operable" is used here with a general meaning. Thus, the attribute "manually operable" also includes the case, for example, where the driver of a vehicle manually operates a shift lever from which an either direct or modified command signal is sent to the shifting device and/or to a clutch device that is part of the vehicle.

The term "manually operable" also includes the case where the driver of a vehicle actuates an appropriate lever or shifting device through a foot pedal.

The invention also covers an arrangement where the actuation of a shift lever to initiate a shifting process in the transmission simultaneously initiates a corresponding actuator movement in the torque-transmitting device, such as a clutch, in which case it is of particular advantage if the detection of the driver's intention to shift gear is precise and reliable.

Nevertheless, the invention also includes an arrangement where a torque-transmitting device such as a clutch is operable by a separate actuating element such as a foot- or hand-operated lever.

In accordance with a preferred embodiment of the invention, the actuating device for the transmission includes an intermediate shifting device by which at least one shift signal can be transmitted from the shifting device to the transmission device. The shift signal is transmitted preferably at certain times, i.e., in the presence of certain criteria.

The intermediate shifting device is for example a mechanical device, but the range of preferred embodiments also includes electrical and/or electromagnetic intermediate shifting devices.

With preference, the transmission or the intermediate shifting device includes at least one shift-actuator shaft. A component such as the shift-actuator shaft is equipped preferably with at least part of a detent-stop arrangement to define one or more positions so that they can be replicated when operating the component.

Particularly in a mechanical configuration, the preferred arrangement has at least two elements that are movable in relation to each other inside the transmission device and/or the actuating device and/or the shifting device and/or the intermediate device.

For example, the shifting device includes a shift lever which is movable at least part of the time within defined tracks. For example, the shifting device may be configured according to an H-shaped shift pattern, where a shift lever is moveable along the different segments of a path resembling the letter H.

According to a further preferred embodiment of the invention, the H-pattern of the shifting device has at least one shifting segment and at least one selecting segment. Preferably, a shifting segment is assigned to each shift level of the transmission. With particular preference, a shift lever can be moved to a defined position or range of positions in the shifting segment corresponding essentially to a specific position of the transmission device where the latter is at a specific predetermined shift level with a specific transmission ratio.

A particularly preferred arrangement of the H-pattern has one shifting segment for each shift level.

In accordance with a further preferred arrangement, a selecting segment is arranged at least partially between the shifting segments.

Thus, in a preferred shifting arrangement, the shift movement from first to second gear first leads through at least part of a shifting segment, then traverses or at least partially follows the selecting segment, then enters another shifting segment to reach the position assigned to second gear.

In a preferred shift layout, the shifting and selecting segments alternate in a meandering pattern.

Also preferred are shift patterns where at least two shifting segments open into a selecting segment. For example, all of the shifting segments may terminate into exactly one selecting segment.

According to a further preferred embodiment of the invention, the transmission device is equipped with a reverse gear. Preferably, the transmission device has a specific segment of the shift pattern assigned to reverse gear. With particular preference, the shifting segments of the shift track arrangement are oriented along a first direction while the selecting segment is arranged along at least one second direction that is different from the first direction. For example, alle shifting segments may be arranged parallel to each other in the same direction, while the selecting segment runs in a different direction, e.g., perpendicular to the direction of the shifting segments.

According to a particularly preferred embodiment of the invention, there is a functional relationship between the movement of an element that belongs to the shifting device and/or an element that belongs to the transmission device and/or an element that belongs to the transmission device and/or an element that belongs to the intermediate device. Preferably, the functional relationship holds true at least within certain tolerance intervals. An example is the relationship between the movement of the shift lever and the corresponding movement of the shift-actuator shaft.

According to a further preferred embodiment of the invention, the detector system for detecting component-related influence factors in the shifting process includes at least one play-detecting device to detect a play in a mechanism.

The play-detecting device is used, e.g., to detect the play of a shift lever at least in specific shift lever positions or ranges of positions. For example, the play detecting device may serve to register a degree of play in at least one force-free position of the shift lever and/or the shift-actuator shaft and/or a component coupled to the shift lever. In a preferred arrangement, at least one component whose movement has a functional relationship to the shift lever movement, at least within certain tolerance intervals, is in an essentially force-free position for the detection of the play.

According to a particularly preferred embodiment of the invention, at least one component that is in a force-free position for the detection of play is held in that position by a detent device. It is particularly preferred to detect the deviation of the component from a zero reference position, which may be identical with the detent position. With particular preference, deviations in the shift lever position are registered only if they exceed a certain threshold of, e.g., three scale increments.

It is preferred if the play of the shift lever within a set shift position can be detected. In the process of this detection, an element of the transmission device and/or the intermediate device and/or the shifting device, such as a shift-actuator shaft, is fixed in an essentially set or settable intended position. Preferably, the intended position can be set in a reproducible manner through a detent device. Particularly preferred is an arrangement where the play in the transmission device and/or the intermediate device and/or the shifting device is in essence only the result of a play in the shift lever.

It is particularly preferred if the detector system can detect the play that is related to the shift signal and/or the shift lever signal. The play could be related, e.g., to components engaged with the shift lever and/or to the interaction of components that are movable in relation to each other.

According to a particularly preferred embodiment of the invention, the play-detecting device is designed to detect the play between a first reference location of a first element and at least one second reference location of a second element. For example, the device has the ability to detect the range of positions that a second element can assume that is coupled to a first element, if the first element is essentially in a fixed position. In addition or as an alternative, the device can be configured to detect the extremes of the range of positions that two elements can take on in relation to each other. This implies, e.g., that when a first element is intended to take on a certain nominal position, the element can take an actual position that is different from the intended nominal position. In addition, the play-detecting device can detect the one or more positions or ranges of positions that the second element can assume. Thus, it is possible to detect the actual positions or ranges of positions of the first element in relation to a nominal position of the first element, and also the actual positions of the second element in relation to the nominal position of the first element. It is further possible to detect the actual positions of the second element in relation to the actual positions of the first element. Thus, it is possible, e.g., to detect the play of the first element in relation to its nominal position.

In addition, it is also possible, e.g., to detect the play of the second element in relation to the nominal position of the first element. Further, the play of the second element relative to the first element can be detected, e.g., based on ranges of movement between the first and second element.

Ranges of movement between elements can have a play for a number of different reasons. For example, the mobility of elements in relation to each other can be provided by couplings or links that have a certain amount of play. Also, dimensional variations similar to a play can be cased by material properties of the elements and the couplings or links between them, such as temperature-related changes in length, or load-dependent changes in length.

With preference, one of the aforementioned two elements or reference locations is part of the transmission device, while the second of the two elements if part of the shifting device. Thus, it is possible to determine the play, for example, between a nominal position of a shift-actuator shaft and the position of the shift lever, and/or the play between the actual position of a shift-actuator shaft and the shift lever, and/or the play between the engagement position of the transmission and the position of the shift lever. According to a particularly preferred embodiment of the invention, the play-detecting device is equipped with a strain-sensing device. Preferably, the strain-sensing device serves to determine the strain of individual components and/or the sum of the strains of a plurality of components and, more specifically, the influence of the strains on the shifting process. For example, a strain-sensing device according to the invention serves to determine the strain of at least one element of the shifting device and/or the transmission device and/or the intermediate shifting device and/or the transmission-actuator device and/or the sum of the strains detected in the aforementioned devices.

Also with special preference, the detector system includes a deformation-detecting device. A deformation-detecting device according to the invention serves to detect deformations of the motor vehicle, particularly of the transmission device and/or the intermediate shifting device and/or the shifting device. The data provided by the deformation-detecting device can be evaluated in particular for the purpose of detecting the presence of a damaged condition in a component. The deformation-detecting device is distinguished from the strain-detecting device in that the deformations are not limited to strain-related deformations. The deformation-detecting device as well as the strain-detecting device can be designed for one-, two-, or three-dimensional detection.

With preference, the strain-detecting device as well as the deformation-detecting device or the play-detecting device, or the detector system is coupled to a diagnostic device. With special preference, a diagnostic device according to the invention is equipped with an automatic learning capability. It is also preferred if the diagnostic device can be accessed from the outside. For example, as a preferred concept according to the invention, if during a repair process certain signal values are detected by one of the aforementioned detecting devices, data are collected about the defective conditions diagnosed in the vehicle, based on certain values determined by the detection device. The data are then, e.g. correlated to the values, so that if the same values are found again in the subsequent operation of the vehicle, a probable recurrence of the same defect can be signalled to the driver of the vehicle.

According to a further preferred embodiment of the invention, the detector system qualitatively captures at least one type of information related to a condition which is caused by a component and/or by a shift signal and/or by a shift lever signal and which has an influence on the shift process or on a signal such as a shift signal and/or a reference signal and/or an offset signal and/;or a constant value.

It is particularly preferred if the influence of the aforementioned condition is also determined quantitatively.

According to another preferred embodiment of the invention, the vehicle is equipped with a gear-level detecting device to detect which of two or more shift levels or transmission ratios is engaged. Preferably, the gear-level detecting device has the ability to detect whether the engaged shift level is a permissible shift level for the vehicle to take off from a stand-still condition, e.g., first gear or reverse. Preferably, the shift level detecting device uses a correlation table or the like, which identifies the shift levels that are permissible to take off from a stand-still condition. According to a further preferred embodiment of the invention, the gear-level detecting device has at least one sensor or is at least part of the time connected to a sensor. The sensor may be arranged, for example, at the shift-actuator shaft. Also with preference, a potentiometer arrangement is used to determine which gear is engaged.

A preferred embodiment of a motor vehicle according to the invention has a position-detecting device to detect the current position of the shift lever. With particular preference, the position-detecting device has, either in addition or as an alternative, the capability of detecting the current speed and/or acceleration of a movement of the shift lever. Also with particular preference, the device is capable of detecting the position and/or direction of movement and/or the acceleration and/or the speed of the shift lever in different spatial dimensions. The invention includes, e.g., the concept that the position-detecting device determines the position and/or the direction of movement and/or the speed and/or the acceleration as a vectorial quantity, e.g., as a three-dimensional vector. A preferred embodiment of the motor vehicle according to the invention is equipped with a shifting device with at least one potentiometer. The potentiometer is configured, e.g., as a linear potentiometer. A linear potentiometer is used preferably for detecting the current position of the shift lever. Also, as a particularly preferred arrangement, the shift lever is connected to the potentiometer. It is further preferred, if the detection of the displacement and/or position by the position-detecting device is supplemented by a measurement of elapsed time and the position data are correlated with the corresponding time values. The time values and/or elapsed time intervals can be determined, e.g., dependent on the clock frequency of an on-board computer device. The position values and time values are used preferably to determine the speed and acceleration of the shift lever.

As a particularly preferred concept, the shifting device has two potentiometers arranged at a certain angle to each other, e.g., 90°. With particular preference, at least one potentiometer is oriented in the direction of a shifting segment, while a second potentiometer is oriented in the direction of a selecting segment. For example, individual potentiometers may be assigned to each of the shifting and selecting segments to determine the position of the shift lever within that segment. It is also a preferred arrangement to have one potentiometer arranged to work for all of the selecting segments and a second potentiometer arranged to work for all of the shifting segments.

The resistance/displacement characteristic of the potentiometers may be identical for all of the potentiometers. However, the scope of preferred arrangements also includes resistance/displacement characteristics that are at least in part different from each other. With particular preference, all of the potentiometers have different resistance/displacement characteristics.

A particularly preferred embodiment of a motor vehicle according to the invention is equipped with a data storage device and/or a data processing device and/or a data evaluating device, e.g., a computer device, to collect, store, process and evaluate the data detected, used or processed by the detector system and/or the different detection devices.

For example, each of the detection devices may be assigned directly to the detector system. However, the detection devices may also be part of another appropriate device that is provided as a standard component of motor vehicles, e.g., a central computer unit. It is also preferred to integrate the aforenamed detecting devices and functions in an electronic clutch management system, or in a clutch control unit.

According to a further preferred embodiment of the invention, the central computer unit or other control unit uses the concept of an operating phase as a time interval. The operating phase begins, e.g., when the engine is started and ends when the engine is turned off.

With particular preference, an operating phase is treated as a unitary time period during which the values determined by the detection devices are processed separately from other operating phases.

It is further preferred to isolate the data values associated with a given operating phase, e.g., by identifying the data values with an index that correlates data values with operating phases. This makes it possible, for example, to combine the data values determined by the detector system with other parameter values that were determined during the same operating phase for a long-term evaluation which, in turn, can be used to uncover long-term trends.

Thus, the invention provides a possibility to determine and evaluate developments occurring within one operating phase as well as developments that occur over longer time periods.

For example, the invention makes it possible to determine a long-term change in a mechanical play caused, e.g., by an increasing state of wear. The determination of the amount of play, in turn, allows play-dependent factors such as a reference signal and/or offset signal and/or constant value to be adapted to the long-term change.

As a further preferred concept under the invention, the processing- and/or evaluating device processes the data from different detection time segments and/or from different operating phases selectively according to certain criteria.

As a particularly preferred concept, the data determined by the detector system are collected and processed over the entire operating life of the motor vehicle.

According to a further preferred embodiment of the invention, the intent-to-shift detection device has the capability to generate a shift lever signal representing the movement and/or position of the shift lever. The shift lever signal can, e.g., be proportionate in magnitude to the current displacement of the shift lever from a reference position. With particular preference, the displacement is determined only as a positive data value. However, the scope of preferred concepts also includes the case where the shift lever displacement is determined in a positive and negative direction. With particular preference, the shift lever displacement is determined in terms of a transformed measuring unit, for example as a number of increments. Particularly preferred is an arrangement with a shift lever increment counter which can be reset to zero at predetermined times and/or in predetermined situations.

Such a situation exists, for example, if the shift lever is detected to be in a position corresponding to one of the shift levels and/or to the neutral state of the transmission. Particularly preferred is a position where the shift lever is force-free, i.e., where no forces are acting on the shift lever.

In accordance with the invention, it is preferred if the intent-to-shift detection device further generates a reference signal. By comparing the reference signal to the shift lever signal, it is possible to detect when a gear-shifting process is about to occur in the transmission. Based on this detection, a signal to a downstream actuator system can be generated already at an early time to activate other devices participating in the gear-shifting process.

With particular preference, the reference signal is generated as a summation of a filter signal and/or a constant value and/or an offset value. It is particularly preferred if the filter signal is generated as a dependent function of the shift lever signal. For example, the filter signal may be generated by processing the shift lever signal through a digital/analog-filter with a time lag. Particularly preferred is a filter in which the signal is linearized. According to the invention, a $PT_1$ filter stage is used as an especially preferred means of generating the filter signal from the shift lever signal. According to another preferred embodiment of the invention, the time lag of the filter is adjustable. It is further particularly preferred if the reference signal is based directly on the shift lever signal, or if the reference signal is formed independently of the shift lever signal.

It is further preferred if the constant value and/or the offset signal of the reference signal are adjustable.

With particular preference, the constant value is matched to the elasticity of the shift rod mechanism and thus to the potential oscillation amplitude. A particularly preferred choice for the constant value is such that, with the typical oscillations of the shift lever during the operation of the vehicle, there will be no cross-over between time profiles of the shift lever movement signal and the reference signal that follows the shift lever signal with a time lag.

With preference, the offset signal is dependent on the torque of the drive source. If the drive source is a combustion engine, it is particularly preferred if the offset signal is set or adjusted dependent on the current throttle valve position.

According to another preferred embodiment of the invention, the constant value and/or the offset signal can be set or adjusted during an operating phase of the motor vehicle. It is particularly preferred if the constant value and/or the offset signal can be adapted to the values, data, or signals determined or calculated by the detector system.

The latter concept is advantageous because it allows the reference signal to be determined on the basis of highly up-to-date values for the play in the force-free extreme positions of the shift lever. This, in turn, is conducive to a more reliable and accurate detection of an impending shift process.

The intent-to-shift detection device preferably sends an intent-to-shift signal to an actuator system arranged downstream, if predetermined criteria are met which are indicative of an intent to shift gears.

With preference, an intent-to-shift signal is emitted when there is a cross-over between the time profiles of the shift lever signal and the reference signal. It is further particularly preferred if a cross-over is artificially generated in the presence of certain situations. For example, it is a preferred concept under the invention, to generate an artificial signal or to send a separate intent-to-shift signal to the downstream actuator system in cases where the shift lever is moved so slowly that a cross-over can never occur or will occur too late because of the time lag of the reference signal. As a part of this concept, it is particularly preferred if the speed of the shift lever movement is monitored—preferably on a continuous basis. Preferably, an intent-to-shift signal of the kind just described is generated if the speed of the shift lever, preferably for a movement in a shifting segment, is greater than zero and less than a predetermined limit.

In a further preferred embodiment of a motor vehicle according to the invention, the intent-to-shift detecting device will not yet emit an intent-to-shift signal at the time of a cross-over between the shift lever signal and the reference signal, but will emit the signal only after a predetermined waiting time, if the intent to shift gears has not been revoked by a an appropriate cancellation signal. The waiting time, which is preferably adjustable or controllable begins at the time of the cross-over.

With preference, a cancellation signal is generated if a reversal of the direction of shift lever movement has been detected. As a particularly preferred part of this concept, the respective lengths of time or distances of travel in the back and forth directions of shift lever movement are taken into account for the decision whether or not a cancellation signal is to be generated. For example, the main direction of movement of the shift lever may be given special weight in the decision for or against generating a cancellation signal.

This makes it possible, e.g., to deal with situations where there is a momentary reversal in the movement of the shift lever, but where otherwise the speed and displacement as well as the general direction of the shift lever movement clearly indicate that a shift process is to be initiated. In this case, the intent to shift will continue to be recognized and a shift-intent counter will not be reset to zero unless further conditions are present.

A situation of this kind can occur during the operation of a vehicle, e.g., if the driver changes his grip on the shift lever to a more comfortable position during the shift process and thereby momentarily moves the shift lever in the opposite direction, but immediately resumes pushing the lever forward towards the intended shift level.

It is also preferred if a control signal is emitted whenever a reversal in the shift lever movement has been detected. The control signal could be used, e.g., to reset a shift counter that was activated at the cross-over between the reference signal and the shift lever signal.

It is likewise among the preferred concepts of the invention to monitor factors like the driving torque and/or the torque load and/or the throttle valve position and to generate a control signal or cancellation signal if these factors are found to run in a direction that contradicts the intent to shift.

With particular preference, the positions of the shift lever are detected and registered in a storage memory for at least one force-free neutral position of the shift actuator shaft. With this arrangement, it is particularly preferred if the shift actuator shaft is held in the force-free neutral position by a detent device to give a substantially reproducible definition to the force-free neutral position. This makes it possible to use fluctuations in the shift lever position for the determination of the shift lever play.

According to a particularly preferred embodiment of the invention, the detector system has a group-assignment characteristic to assign the collected or calculated or detected data values, such as shift lever positions and/or shift lever movements, to at least one group.

It should be noted that in the context of the present invention, the terms "group-assignment characteristic" and "group" encompass a broad range of meanings.

Thus, a group-assignment characteristic can, for example, assign collected or calculated values to a certain group based on specific existing criteria, e.g., based on conditions under which the data were collected and/or calculated, where the group is specifically distinguished as the recipient of all data that meet the specific group's criteria.

A group-assignment characteristic in the sense of the invention may also include, e.g., that an assignment of the data in the strict sense of the word is not taking place but that the incoming data are already classified at the time of collection, based on the nature of the data. The classification of a set of data may be, for example, that the data were collected when the transmission was at a predetermined level, e.g., in neutral, the shift lever or a component coupled to the shift lever was in a force-free position, and the shift lever was being moved slowly or was in a stationary condition.

The invention also includes the concept that the shift lever position data are not separately classified or checked according to criteria, but are simply registered as values that were collected in the presence of the preset conditions.

It should be noted in this context that the force-free condition of the shift lever as described above may be ascertained, e.g., from the fact that a signal of the transmission-mounted sensor for the shift movement deviates from a neutral value (defined, e.g., as 512 increments) or from an other unequivocally defined and preferably reproducible position by no more than a predetermined number of measuring increments.

The term "group" may, e.g., relate to a storage register section in which, e.g., detected data values meeting specific criteria are stored. However, the group concept may also include the understanding that values such as shift lever positions are collected only if specific conditions are present, in which case the collected values are automatically assigned to a group that corresponds to the specific conditions. The specific conditions under which data are collected are, e.g., the aforementioned conditions identified as "shift level=0 (neutral)"; "shift lever in a force-free condition"; and "slow movement or no movement of the shift lever", In a preferred embodiment of the invention, shift lever position data are collected under the conditions identified as "shift lever in a force-free condition"; and "slow movement or no movement of the shift lever" and assigned to different groups in correlation with different shift levels including the neutral as well as other shift levels.

For example, the invention proposes a group in which the maximum values of the shift lever position are registered and another group in which the minimum values are registered. A specific shift lever position is designated as representing the border value between the group of maximum values and the group of minimum values. Under a preferred concept, all values greater than the border value are lumped together into the group "maximum values of the shift lever position", and all values below the border value are lumped together into the group "minimum values of the shift lever position".

It is likewise preferred to have a group "maximum values of the shift lever position" in which all positions are registered that lie within a specified range. For example, the lower limit of the range is the previously found maximum shift lever position, while the upper limit of the range exceeds the value for the lower limit by a predetermined amount of, e.g., one increment. When a value is found to lie within this prescribed range, the lower limit of the group "maximum values for the shift lever position" is replaced by the new value, while the upper limit is raised accordingly (e.g., to the new value of the lower limit plus one increment).

As an alternative or as an additional possibility, it is also preferred to have a group "minimum values for the shift lever position", in which values for the shift lever position are registered if they fall within a prescribed range. According to the preferred concept, the upper range limit of the group "minimum values for the shift lever position" corresponds to the previously established minimum value for the shift lever position, while the lower limit is set at a prescribed distance from the upper limit, e.g., at the upper limit minus one increment. Under the preferred concept, if a detected value of the shift lever position falls into this range, it will be used to replace the upper limit of the range, while the lower limit is changed accordingly, e.g., to the new upper limit minus one increment.

Also preferred is a concept where instead of the inner limits, the outer limits of each range are replaced by new values so that the plus/minus signs for the respective numbers of increments are reversed.

It is particularly preferred according to the invention, if the play of the shift lever is determined based on a dynamic change of the ranges of the aforementioned groups. With preference, values that are not assigned to either of the groups "maximum values for the shift lever position" or "minimum values for the shift lever position" after they have been detected and tested according to the group criteria are discarded, i.e., not entered into the storage register.

According to a preferred embodiment of the invention, the time profile of the range limits is retained as stored information. Likewise among the preferred concepts, the time profile of only one of the range limits is entered into a storage register. For example, only the maximum and minimum values of the shift lever positions, i.e., one range limit at each end, are stored as a function of time.

In a particularly preferred embodiment of a motor vehicle equipped with a detector system according to the invention, the play or deviation of the shift lever position is detected for the movement of the shift lever between two shift levels.

This means in particular, that the minimum as well as the maximum displacement travel of the shift lever is detected for a direct shift from a predetermined first shift level to a predetermined second shift level.

As a preferred way of practicing the foregoing concept, the minimum and maximum positions are determined for the two shift levels.

Preferably, the foregoing determination is performed under the previously stated conditions where one of the shift levels is the neutral level and where the shift lever is force-free and moving either very slowly or not at all.

By taking the difference between the maximum and minimum positions for each of the two shift levels and then adding the two differences, the maximum variation in shift lever travel is obtained that can occur in different shift processes from the prescribed first gear level to the prescribed second gear level and vice versa.

The maximum variation in shift lever travel can be used to calculate the play in the same way as the maximum/minimum difference within a gear level is calculated.

Furthermore, the maximum variation in shift lever travel is preferably used in the determination of the reference signal.

In accordance with the invention, it is particularly preferred if the maximum difference or maximum variation is calculated for every possible shift process, i.e., in particular for every possible combination of one gear level with another.

In accordance with a particularly preferred embodiment of the invention, the group-assignment characteristic has a part that works as a selection- or elimination characteristic. The selection/elimination characteristic has the purpose of selecting certain ones among the detected and calculated values for further processing. With preference, the selection/elimination characteristic employs prescribed selection criteria for deciding which values are to be processed further.

If the selection involves more than one selection criterion, the method of selection is preferably designed so that a value is selected for further processing only if all of the selection criteria are met.

Nevertheless, also included among the preferred concepts is the case where the selection characteristic selects a value for further processing if only one of a plurality of selection criteria is met.

It should also be noted here, that the term "selection/elimination characteristic" in the present context covers the same wide range of meanings as the term "group-assignment characteristic".

It is especially preferred to have a certain selection criterion requiring that a measurement value or calculated value must lie within a prescribed range in order to be selected.

For example, in a particular case this criterion may require that a measured value lies in a range between a lower limit corresponding to a previously registered maximum value and an upper limit that exceeds the previously registered maximum value by a given incremental difference. To complete the example, an analogous selection criterion may also be used for the minimum value and the associated selection range. Also among the preferred concepts, the selection criterion may require a measured or calculated value to lie in a range delimited between an upper limit that exceeds the previously registered maximum value by a given incremental difference and a lower limit that undercuts the previously registered maximum by a given incremental difference.

Likewise preferred is a selection criterion which allows a detected or calculated value to deviate from an average value of previously registered and/or selected values by no more than a first amount in the positive direction and by no more than a second amount in the negative direction. The range of preferred solutions includes the case where the first and second amounts are equal.

Preferably, the average value is calculated as the arithmetic mean, i.e., the quotient between the sum and the count of the previously registered individual values.

Also among the preferred concepts, a weighted average may be used instead of the arithmetic mean, using a prescribed weight function. For example, the individual values may be weighted differently dependent on their distance from a predefined reference point.

In accordance with a preferred embodiment of the invention, the detected and/or selected values are accumulated into a history, where the term "history" is meant to encompass a broad range of meanings.

Thus, the term "historical storage" in the present context means, e.g., that the detected or calculated values are registered in chronological sequence.

The term "historical storage" further encompasses the possibility where values detected or determined in the past are stored without regard to their chronological sequence.

According to a particularly preferred embodiment of the invention, the values that have been determined, calculated or processed are erased at predetermined points in time. As an example, in a certain embodiment the values may be stored only over the length of an individual operating phase. Also preferred is the concept of storing data only if they have a certain relevance with respect to further evaluation measures. This may mean for example, that only the current maximum and minimum values are registered while values in between may be ignored.

According to a particularly preferred embodiment of the invention, "erased" values are transferred to a long-term storage register, so that they remain available for special situations, e.g., to evaluate a long-term history.

A motor vehicle according to a particularly preferred embodiment of the invention is equipped with a noise-elimination device. The noise-elimination device allows the removal of noise components from the detected and/or calculated values, or from series of detected and/or accumulated values.

With particular preference, the noise components of signals are eliminated by taking an average of a plurality of individual values. The averages used for the elimination of noise components may be weighted averages, but the scope of preferred solutions also includes non-weighted averages.

Preferably, the individual values entering into an average are selected according to a given characteristic. For example, the characteristic may prescribe to take averages based on a certain number of consecutively detected individual values so that, e.g., the first ten detected or registered values would make up a first average, the eleventh through the twentieth value would make up the second average, and so forth.

It is also one of the preferred concepts to use each value in more than one average, for example by taking a first average based on values 1 through 10, a second average based on values 2 through 11, a third average based on values 3 through 12, and so forth. It should be noted that the foregoing selection characteristics for forming averages are meant as examples and that the invention encompasses a multitude of other possibilities of calculating an average.

According to a particularly preferred embodiment of the invention, only those individual values are processed into averages that were detected or collected under specific conditions, e.g., values that were detected while the transmission was at the neutral gear level (gear level=0) or, alternatively, at a specific gear level other than neutral, and while the shift lever was essentially force-free and the speed of shift lever movement was either zero or very small.

With preference, the averages discussed above are assigned to subgroups, whose criteria are essentially analogous to the criteria of the aforementioned groups.

It should be noted that the foregoing example, where ten individual values are combined into an average, is not to be taken as a limitation of the invention.

In principle, an essentially arbitrary number of individual values can be used to calculate an average value.

With particular preference, an average value is made up of individual values that meet a prescribed criterion. For example, an average is taken of individual values representing the shift lever position at a specific gear level (which can be the neutral or any other gear level). It should be noted that a specific gear level or specific condition should preferably be understood to include a small range of variation that can be caused, for example, by a mechanical play.

It is particularly preferred to use the averages for the determination of the minimum and maximum shift lever positions—preferably within a given gear level—in an analogous manner as described above for individual values.

It should be noted that, in essence, every operation that was described above for individual values can also be performed with the corresponding average values, and vice versa.

According to a particularly preferred embodiment of the invention, a certain number of individual values is considered to determine an average in a manner where the actual calculation of the average is based on only a part of the values considered.

As a particularly preferred example of the foregoing concept, the largest and the smallest of the individual values considered are disregarded in the calculation of the average. This means that, e.g., of ten values considered, only eight are entered into the calculation of the average. However, the range of advantageous possibilities according to the invention also includes the option of disregarding the two smallest and/or largest, or disregarding the three smallest and/or largest of the individual values.

The purpose of the foregoing way of calculating an average is to keep statistical outliers from entering into the calculation.

As a further preferred concept, certain intervals between individual values are taken into account in determining which values are to be considered in calculating an average.

According to the invention, to apply the foregoing concept in a case where one had, e.g., n=10 individual values, one would establish the difference between the largest and the smallest of the ten values. The largest of the ten individual values will be entered into the calculation of the average only if the interval I between the largest and the second-largest individual value is less than one-ninth of the aforementioned difference between the largest and smallest of the ten values, or generally if I<[largest value-smallest value]/(n−1). The smallest individual value, likewise, is entered into the calculation of the average only if the interval between the smallest and the second-smallest individual value meets the aforementioned condition. According to a particularly preferred embodiment of the invention, the minimum values and the maximum values of the averages for specific conditions are entered into a max/min storage device or storage register.

A specific condition in the sense of the foregoing paragraph may encompass, e.g., that the individual values were detected while the shift lever was in an essentially force-free state, the transmission was at gear level zero (neutral), and the speed of shift-lever movement was zero or very small.

Another specific condition in the sense of the foregoing paragraph may require that the individual data values were detected while the shift lever was in an essentially force-free state, the transmission was at a gear level other than zero, and the speed of shift-lever movement was zero or very small. Further preferred is an arrangement where max/min storage registers are correlated with specific gear levels.

With preference, the maximum values and minimum values in the max/min registers are updated if a larger maximum value or a smaller minimum value has been found.

The relevant considerations for updating or replacing previously stored maxima and minima with new values as described above for maxima and minima of individual values are likewise applicable to the maxima and minima of the averages. In particular, a maximum or minimum value of the averages is replaced only if the new maximum- or minimum value deviates from the previously stored value by no more than a prescribed amount, e.g., by one measuring increment.

It should be noted that a measuring increment is, for example, four tenths of a millimeter.

According to a particularly preferred embodiment of the invention, the play-detecting device determines at least one amount of play based on the maximum- and/or minimum values of the registered or detected individual values or based on the average values. With particular preference, the play that is being determined is the play of the shift lever.

According to a particularly preferred embodiment of the invention, the play of the shift lever can be determined separately for each gear level.

With particular preference, the play in the neutral position is taken as representative for the absolute amount of play of the shift lever and, accordingly, the play is preferably determined only for the neutral position.

It is preferred to store the values for the amounts of play in each gear level and also, to update the stored values when a change has been found in an amount of play.

With particular preference, the play is determined for the force-free positions of the shift lever in more than one gear level, preferably for all gear levels other than the zero level.

According to a particularly preferred embodiment of the invention, the amounts of play for the individual gear levels are compared, and an absolute play of the shift lever is determined as the maximum among the amounts of play for the individual gear levels.

It is also particularly preferred to store only the absolute amount of play of the shift lever and, if a larger amount is subsequently determined, to update the stored value of the absolute amount accordingly.

It is also preferred to store the time profile of the absolute amount of play to make it available for a long-term evaluation.

According to a particularly preferred embodiment of the invention, the reference signal is established dependent on the amount of play, e.g., dependent on the play of the shift lever at a given gear level, or dependent on the absolute play of the shift lever.

According to a particularly preferred embodiment, the reference signal is, in essence, continually adapted to changes in the detected amounts of play, particularly while the vehicle is in operation.

According to a particularly preferred embodiment of the invention, the value for the play is entered into the calculation of the offset signal.

It is likewise preferred to use the value for the play in determining the constant value.

With particular preference, the play is determined as the difference between correlated minimum- and maximum values.

With preference, the play of the shift lever in a force-free position within a gear level is determined as one-half of the difference between the maximum value and the minimum value of the possible shift lever positions for that gear level.

It should be noted that while shift lever positions are preferably detected in a force-free state, the scope of the invention also includes arrangements to detect strain, typically of a small magnitude.

As a general note, wherever the word "or" is used in the present context in reference to features of the invention, it may be used either in the Boolean sense (one or the other or both) or as an exclusive "or" (one or the other but not both).

It should further be noted that the terms "control" and "controlling" as well as derivatives of these terms are used with a wide range of meanings, including in particular the concepts of regulating and/or controlling as used in German Industry Standards (DIN).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

The invention will be discussed on the basis of the attached drawing (without restricting the invention to the specific details illustrated), which represents an example of an embodiment, wherein.

DETAILED DESCRIPTION OF PREFERRED EMBODIMENTS

Figure 1:
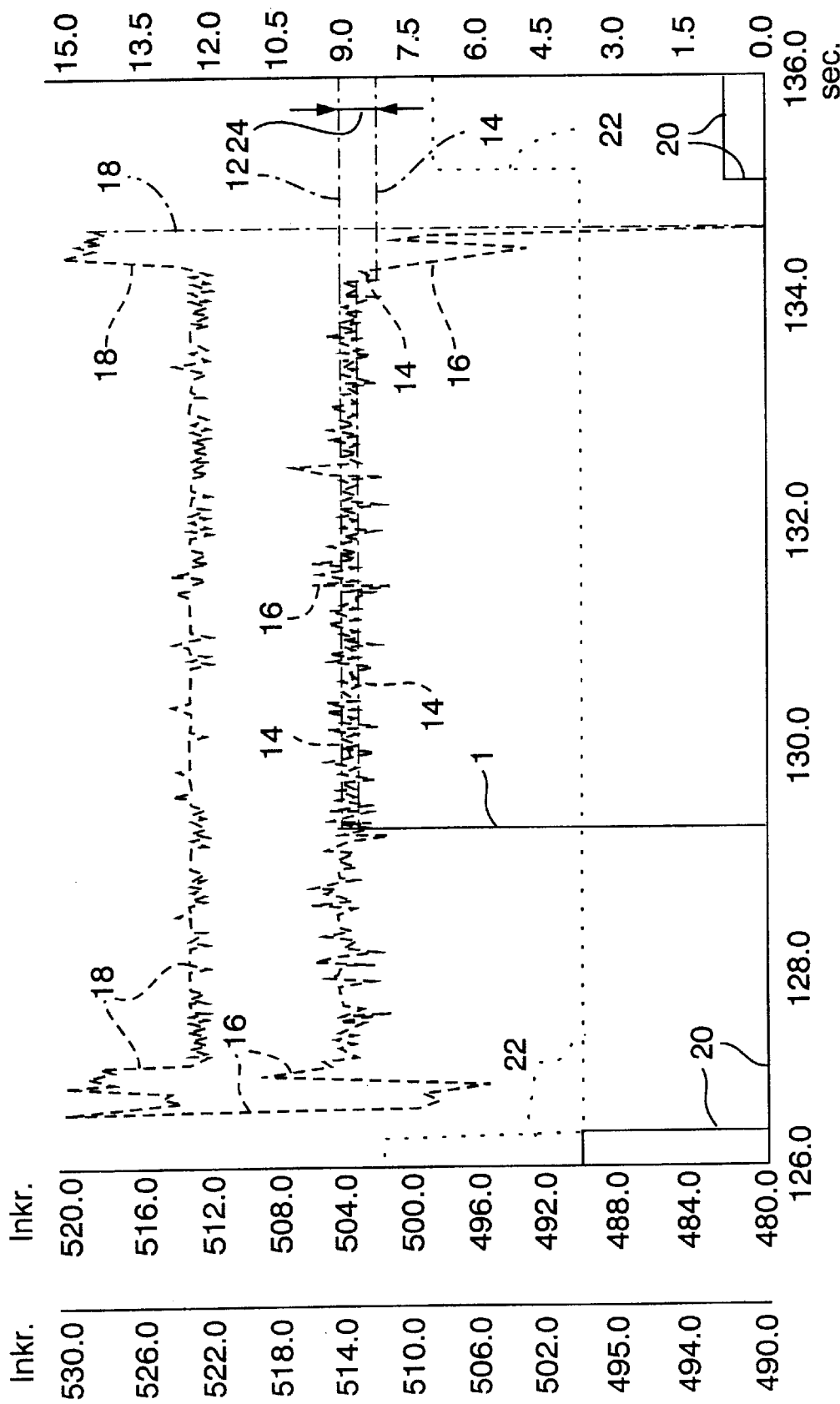
FIG. 1 represents a first example of a time profile of a sensor signal of a motor vehicle according to the invention.

FIG. 1 represents a first example of a time profile of a sensor signal that can occur in a motor vehicle according to the invention. The illustrated signal occurs for example at the beginning of an operating phase.

Illustrated in the graph are the time profile of the minimum shift position 12, the profile of the maximum shift position 14, the signal 16 of a shift-lever position detecting device such as a potentiometer, the signal of a transmission-mounted position sensor 18 such a potentiometer, the time profile 20 of the shifting activity between different gears as well as the time profile of a numerical status identifier 22.

The time profile 20 of the shifting activity indicates that the transmission is being shifted from fourth gear through neutral into first gear. Driving in fourth gear, or "normal" driving, is assigned a status identifier value of 8. When the transmission has been shifted to neutral, an identifier value of 4 signifies that the neutral mode of the transmission has been recognized. As the shift-position indicator 20 steps up (at the point of shifting into first gear), the status identifier 22 steps up to a value of 7. The numerical value of 7 corresponds to a state of beginning movement of the vehicle.

Shortly after the transmission has been shifted into neutral, corresponding to a value of 4 for the status identifier 22, the position sensor signal 18 of the transmission settles to an essentially constant value, in the illustrated case at about 512 scale increments. This steady position is held preferably by means of a detent mechanism. The detent mechanism is arranged, e.g., on the shift-actuator shaft, so that the time profile graph 18 represents also the position vs. time graph for the shift-actuator shaft.

It should be noted that the aforementioned detent arrangement is not to be interpreted as a limitation of the invention.

A detent arrangement can also be provided for other positions, e.g., corresponding to the different shift levels. The invention also covers the concept of detecting the shift lever position or the play of the shift lever position for transmission modes other than neutral. It should further be noted that a reference position such as the position of the shift-actuator shaft could also be detected by way of monitoring other elements or other situations.

The signal graph 16 representing the shift lever position, likewise, settles to an approximately constant value following a brief oscillatory phase shortly after the time mark of 126 seconds in the diagram. The term "approximately constant" in this context has a broad meaning. As may be concluded from the fact that there is a play to be detected, it is acceptable for the shift lever position to fluctuate to a certain extent. However, with the embodiment discussed here, it is essential that the fluctuations in the position of the shift lever are not causing a change in the position of the shift-actuator shaft. The essentially invariant position of the shift-actuator shaft ensures that the shift lever is essentially force-free. However, a slight change in the position of the shift-actuator shaft (e.g., by three scale increments) is permissible.

As soon as the detection system has found that the transmission has been set into neutral, that the shift-actuator shaft is essentially at its neutral position (at 512 scale increments), and the rate of change in the shift lever position is essentially zero, the detection process to find extremes in the shift lever position is started. Thus, an extreme position is detected for the first time at the time mark of 129 seconds. Because only one position is being monitored, the time profile 12 of the minimum and the time profile 14 of the maximum are essentially the same. Measurements are repeated at short intervals. After ten measurements have been collected, a mean value is calculated and compared to the previously established maximum value 14 and minimum value 12. If the mean of the ten measured values is found to be greater than the previously established maximum 14 or smaller than the previously established minimum 12, the maximum or minimum is replaced by the new value.

Preferably, however, the value is replaced only if the new value deviates from the old value by no more than a predetermined limit of, e.g., one increment. This condition is essentially met at a point shortly after the time mark of 129 seconds. Before this point in time, the maximum 14 and minimum 12 were identical. The newly determined mean value is greater than the previously established maximum (note that the length scale of the shift lever position is reversed in the graph). The time profile 14 for the maximum therefore shows a step which indicates that the newly determined maximum is greater than the previously established maximum.

In the time period from 129 to slightly beyond 134 seconds, the same kinds of repeated measurements take place.

As can be seen in the illustrated example, the shift lever position values detected up to the time slightly after the 134-seconds mark are neither greater that the previously established maximum nor less than the previously established minimum. Accordingly, neither of the time profile graphs for the maximum and minimum show a step change. A step-change in the maximum value occurs shortly after the 134-seconds mark, because the mean value of 10 measurements has again been found to be greater than the previously established maximum. Almost immediately after this step change of the maximum, the graph 18 of the shift-actuator shaft position and the graph 16 of the shift lever position show large changes. This is the point were the shift lever is being moved, which is also reflected in the graph 18 for the position of the shift-actuator shaft. The required conditions for the position monitoring process—shift lever in a force-free state, transmission in neutral, no appreciable movement of the shift lever—are no longer present at this point. The monitoring of the shift lever position to search for extremes is therefore cancelled.

The interval 24 between the maximum 14 and the minimum 12 corresponds to the total range of the play, i.e., double the amount of the play observed in one direction. Thus, the amount of play can be determined at each point in time and can be taken into account, e.g., when establishing a reference signal.

Figure 2:
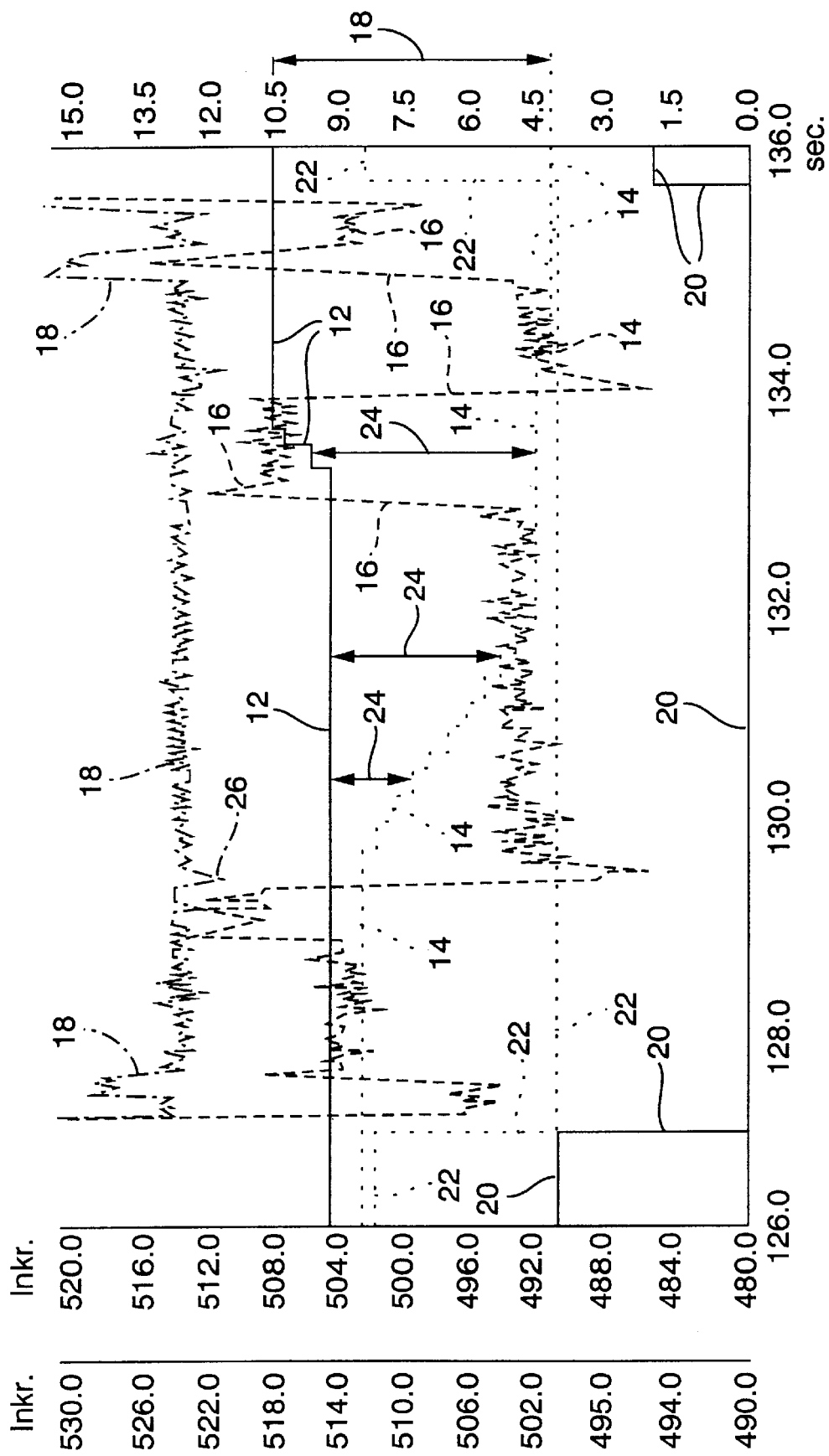
FIG. 2 represents a second example of a time profile of a sensor signal of a motor vehicle according to the invention.

FIG. 2 represents a second example of a set of time profiles of signals that can occur in a motor vehicle according to the invention. The signals shown in FIG. 2 can occur, e.g., in the middle of an operating phase.

The status identifier 22 steps down from a value of 8 to a value of 4 and back up to a value of 8, corresponding to a change in the operational-status from "driving" to "neutral" and back to "driving". The shift-position indicator 20 changes from fourth gear through neutral to second gear.

Analogous to the description given above for FIG. 1, the play 24 (i.e., double the amount of the one-directional play) is again determined while the transmission is in neutral.

The conditions that have to be present for the detection of the play are the same as previously discussed in the context of FIG. 1, i.e., the sensor on the transmission may not show a deviation from its neutral condition (512 scale increments) by more than a predetermined maximum amount. As a further requirement, the shift lever has to be essentially at rest. In addition, the transmission must have been set to the neutral gear level.

At the point labeled 26 on the time profile 18 of the transmission sensor, the latter still shows an amount of movement greater than the required maximum allowable deviation from the neutral position (the latter corresponding to 512 scale increments). Accordingly, the detection process for the extreme values is not yet being started at this point. As can be seen in the graph, after the shift lever has settled from a short transient oscillation immediately before the time mark of 132 seconds, the signal 18 of the transmission sensor stays likewise within predetermined boundaries. Accordingly, this is the point where the detection of extreme values begins. The same procedure is followed as above, i.e., the mean of ten detected values is determined and compared to the previously established maximum and minimum values. As can be seen in the graph, a difference between the maximum value 14 and the minimum value 12 was detected, or existed, already at the beginning of the illustrated time window at 126 seconds, which means that a play was detected already at the time of 126 seconds.

Shortly before the time mark of 132 seconds, the maximum signal gradually adapts itself to the position of the shift lever which has established itself slightly before the time mark of 132 seconds in the time profile 16 of the shift lever signal. The graph representing the maximum has essentially settled shortly before the time mark of 134 seconds, so that there are no longer any values larger than the previously established maximum. After another jump in the shift lever signal 16, slightly after the time mark of 134 seconds (which is not accompanied by a corresponding jump in the transmission sensor signal 18), shift lever positions are detected that are below the previously established minimum value.

The same procedure is followed as above, i.e., determining the mean of ten detected values and comparing it to the previously established maximum and minimum values. As can be seen from the time profile 12 in the graph, the newly detected minimum value at certain predetermined times has been found to be smaller than the previously established minimum value, and the minimum value has been raised accordingly.

After another jump in the time profile of the shift lever signal, which is accompanied over a short time interval by a corresponding reaction in the time profile of the transmission sensor, the required conditions for the detection of extreme values are again present.

At a point shortly after 136 seconds, the detection of extreme values turns up a new maximum value that is greater than the previously established maximum value; therefore, the previously established maximum value is replaced by a new maximum value. At the end of the illustrated time window, the maximum value and the minimum value differ by about 16 measuring increments, corresponding to a play of approximately 8 increments.

It should be noted that in the time window between 126 and 136 seconds, the values for the play fluctuate in accordance with the increasingly divergent profiles of the maximum values 14 and minimum values 12.

The fluctuation in the time profile of the play values can at any time be used for further computations—e.g., to establish the reference signal or the offset portion of a reference signal or the constant portion of a reference signal.

Figure 3:
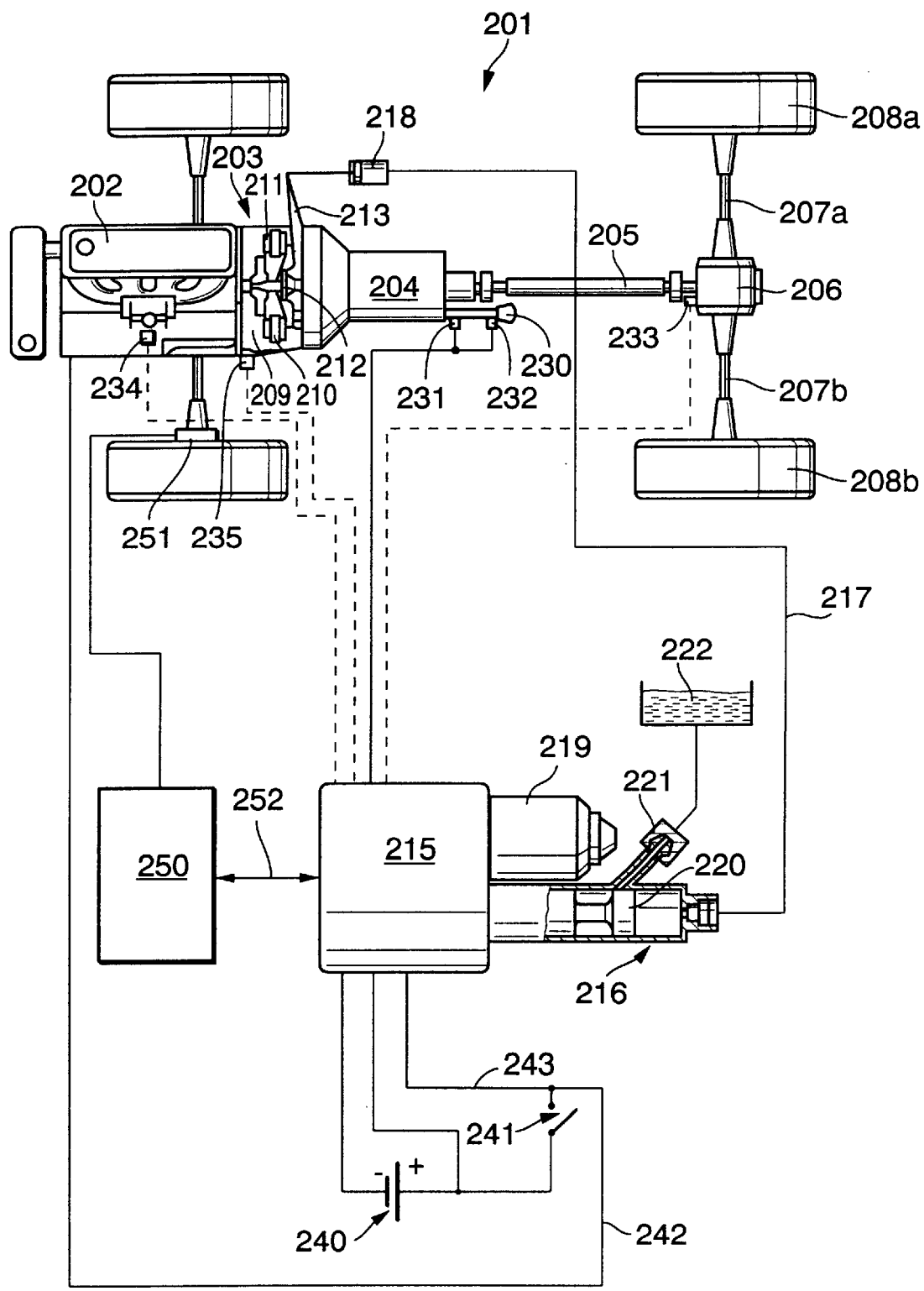
FIG. 3 represents a schematic view of a motor vehicle according to the invention.
Figure 4:
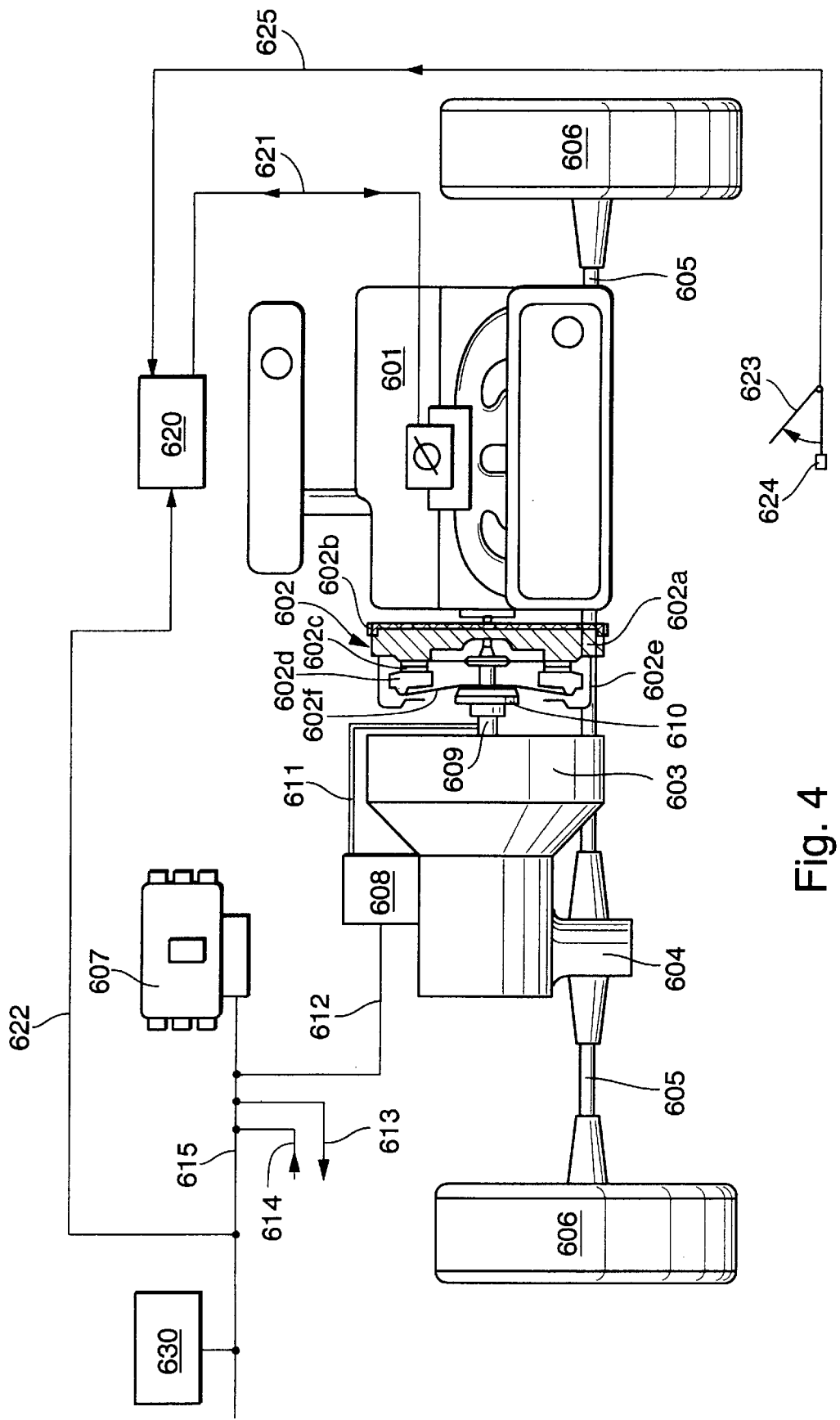
FIG. 4 represents a schematic view of a motor vehicle according to the invention.

Each of the FIGS. 3 and 4 shows a different embodiment of the invention.

FIG. 3 illustrates a vehicle 201 with a drive source 202, such as a combustion engine or a hybrid drive arrangement with a combustion engine and an electric motor, with a torque-transmitting system such as a clutch 203, and a transmission 204 followed downstream in the drive train by a drive shaft 205, a differential 206, and two driving axles 207a and 207b which, in turn, are connected to the driven wheels 208a and 208b. The torque-transmitting system 203 is represented as a friction clutch with flywheel 209, pressure plate 210, clutch disc 211, release bearing 212 and release fork 213. The release fork is operated by means of an actuator 215 with a master cylinder 216, a pressure conduit such as a hydraulic line 217 and a slave cylinder 218. The actuator is shown as a pressure-medium based actuator with an electric motor 219 acting on a master-cylinder piston 220 through a motion-transmitting mechanism, so that the torque-transmitting system can be moved into and out of engagement by means of the hydraulic line 217 and the slave cylinder 218. The actuator further includes the electronics for energizing and controlling the actuator, i.e., the power electronics as well as the control electronics. The actuator is equipped with a sniffle bore 221 which connects to a reservoir 222 for the pressure medium.

A shift level detecting sensor 231 and an intent-to-shift detecting sensor 232 are arranged at the gear-shifting lever 230. The intent-to-shift detecting sensor 232 recognizes from the movement of the shift lever or from a force applied to the shift lever when the driver of the vehicle 201 is about to shift gears. The vehicle is further equipped with an rpm sensor 233 detecting the rpm rate of the transmission output shaft 205 or of the driven wheels 208a and 208b. The vehicle further has a throttle valve sensor 234 to detect the throttle position, and an rpm sensor 235 for the rpm rate of the engine.

The gear level detecting sensor 231 recognizes the position of mechanical shifter elements in the transmission and thereby determines which gear level is engaged, sending a corresponding signal to the control unit. If the gear level detecting sensor is an analog sensor, it can also detect the movement of the mechanical shifter elements of the transmission, so that the next gear level to be engaged can be recognized at an early stage.

The actuator 215 is supplied with power from a battery 240. The vehicle power plant is further equipped with an ignition switch 241, usually a with several switch positions and, as a rule, activated by means of the ignition key, whereby the starter motor of the combustion engine 202 is energized by way of the power line 242. A signal is sent through the line 243 to the electronic unit of the actuator 215, e.g., to activate the actuator when the ignition is turned on.

Block 250 in FIG. 3 represents an anti-rollback control device which is connected to at least one vehicle brake 251 to actuate the latter automatically at least temporarily for the purpose of preventing the vehicle from rolling backwards, e.g., when starting up on an incline. The anti-rollback control unit 250 is connected to the control of the automated clutch through the signal connection 252.

FIG. 4 gives a schematic representation of a power train of a motor vehicle with a drive source 601, such as a combustion engine or other kind of motor, with a torque-transmitting system 602 such as a friction clutch, dry-friction clutch, or wet friction clutch, a transmission 603 as well as a differential 604, drive axles 605, and driven wheels 606. The wheels may be equipped with rpm sensors (not shown) to detect the rpm rates of the wheels. The rpm sensors may also be functionally related to electronic systems such as e.g., an anti-lock braking system (ABS). The drive source 601 can also be designed as a hybrid drive that includes, e.g., an electric motor, a flywheel with a freewheeling arrangement, and a combustion engine.

The torque-transmitting system 602 is designed as a friction clutch, but is could also be configured as a magnet-powder clutch, laminar-disc clutch, or as a torque converter with a lock-up clutch or other clutch. Also shown in FIG. 4 are a control unit 607 and a schematically represented actuator 608. The friction clutch can also be configured as a wear-compensating self-adjusting clutch.

The torque-transmitting system 602 is mounted on or connected to a flywheel 602a. The flywheel 602a can be a divided flywheel with a primary mass and a secondary mass, a damper device between the primary and secondary masses, and a gear-tooth profile 602b for the engagement of the engine starter on its outside circumference. Overall, the torque-transmitting system has a clutch disc 602c with friction linings, a pressure plate 602d, a clutch cover 602e, as well as a diaphragm spring 602f. In addition, the self-adjusting clutch is equipped with adjusting and wear-compensating means. A sensor such as a force sensor or displacement sensor is arranged to detect a situation when an adjustment is needed and when the conditions for performing the adjustment are present.

The torque-transmitting system is operated by means of a release mechanism 609, such as a hydraulically operated central release device, which may have a release bearing 610 to engage and disengage the clutch. However, the release mechanism can also be configured as a mechanical release device which acts on a release bearing or comparable element.

To engage and disengage the clutch, the actuator 608 controls the movement of the mechanical or hydraulic clutch release device 609 by means of a mechanical connection or through a hydraulic transmitting system or hydraulic line 611. The actuator 608, through at least one output element or through a plurality of output elements, actuates the shift movements of the transmission, e.g., where the output element or elements of the actuator 608 are operatively connected, e.g., to a central shift-actuator shaft of the transmission. Thus, the actuator actuates the movement of shifter elements inside the transmission for engaging, disengaging, or changing gear levels or ratio levels, such as a central shift-actuator shaft or linkage rods or other shifter elements.

The actuator 608 can also be configured as a cylinder actuator that is arranged inside the transmission. By a controlled rotary displacement, a shifter cylinder moves elements that are guided in tracks on the cylinder surface and thereby actuates the different gear levels. The actuator for the shifting of the ratio levels can also include the actuator for the torque-transmitting device, in which case the actuator needs to have an operative connection to the clutch release device.

The control unit 607 is connected to the actuator by way of the signal line 612, so that control signals and/or sensor signals and/or operational status signals can be exchanged, transmitted or interrogated. Furthermore, the signal lines 613 and 614 are available, through which the control unit is connected at least at certain times to additional sensors or electronic units. Examples of such electronic units are an engine control unit, an ABS control unit, or and anti-slip control unit. Additional sensors may include general status monitors of the vehicle such as rpm sensors of the engine and the wheels, throttle-position sensors, accelerator-pedal position sensors, or other sensor devices. The signal line 615 connects to a databus such as, e.g., a CAN bus (where CAN stands for Controller Area Network), through which system data of the vehicle or of other electronic units can be communicated, as the electronic units are usually networked by computer units.

An automated transmission can be shifted in a manner where the gear change or ratio change is initiated by the driver, e.g., by using a switch to give a signal to shift either up or down. It is also possible to provide a signal through an electronic shift lever to direct the transmission to shift into a specific gear. However, an automated transmission can also perform the gear-shifting process automatically at certain predetermined points, e.g., based on sensor signals and using characteristic data values, curves, or data arrays, without the driver having to initiate the gear change.

The vehicle is preferably equipped with an electronic gas pedal 623 or an engine-load control lever, where the gas pedal 623 gives input to a sensor 624 that communicates with the electronic engine control unit 620 which, on the basis of the sensor signal, controls or regulates, e.g., the fuel supply, the ignition timing, fuel injection timing or the throttle valve position, by way of the signal line 621 that leads to the engine 601. The electronic gas pedal 623 with its sensor 624 is connected to the electronic engine control unit 620 by way of the signal line 625. The electronic engine control unit 620 is operatively connected to the control unit 607 by way of the signal line 622. The arrangement may further include an electronic transmission control unit 630 in signal communication with the units 607 and 620. It is practical to control the throttle valve position through an electric motor which, in turn, is controlled by the electronic engine control unit 620. In systems of the kind just described, a direct mechanical connection to the gas pedal is no longer necessary nor practical.

To summarize, the invention covers a motor vehicle with at least one actuator device to actuate a transmission, at least one intent-to-shift detection device that recognizes when a gear-shifting process is about to occur and/or has been initiated, and at least one detector system to detect the presence and/or magnitude of factors that have an influence on the shift process and are related to components and/or to shift signals and/or to the shift lever; and the invention further covers a method of detecting a driver's intention to shift gear.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A motor vehicle, comprising a power train with:
   at least one drive source to generate at least one mechanical drive quantity;
   at least one output device to produce at least one mechanical output quantity;
   at least one transmission device arranged in the power train between the at least one drive source and the at least one output device, to convert a transmission input quantity into a transmission output quantity, the transmission device being operable to shift from one to another of at least two different gear levels that are distinguished by different transmission ratios between respective magnitudes of the transmission input quantity and the transmission output quantity;
   at least one transmission-actuator device to actuate the shifting from one to another of the at least two gear levels;
   at least one intent-to-shift detecting device to detect when a gear shift is about to occur; and
   at least one detector system to detect the presence of a performance-affecting condition having an influence on the shifting of the transmission device.

2. The motor vehicle of claim 1, wherein
   the at least one intent-to-shift detecting device generates an intent-to-shift signal;
   the performance-affecting condition is at least one of a wear condition characterized by wear-related operating parameters of the motor vehicle, and a production-related condition characterized by production-related operating parameters of the motor vehicle; and
   the motor vehicle further comprises at least one adaptation device to adapt the at least one intent-to-shift signal to the performance-affecting condition.

3. The motor vehicle of claim 1, wherein the transmission-actuator device comprises at least one shifting device operable for at least one of the functions of receiving a shift signal and generating a shift signal.

4. The motor vehicle of claim 3, comprising at least one shift lever operable to receive a shift lever input signal and to introduce said shift lever input signal into the shifting device.

5. The motor vehicle of claim 4, wherein at least one of the shift lever and the shifting device is manually operable.

6. The motor vehicle of claim 4, wherein the transmission-actuator device comprises at least one intermediate shifting device operable to transmit at least one signal between the shifting device and the transmission device.

7. The motor vehicle of claim 6, wherein at least one of the transmission device, the transmission-actuator device, the shifting device, and the intermediate shifting device comprises at least two elements that are movable in relation to each other.

8. The motor vehicle of claim 7, wherein at least one of the at least two elements is essentially constrained to another of the at least two elements by one of a pivotal connection and a guide.

9. The motor vehicle of claim 8, wherein the guide constrains the at least one element in relation to said other element essentially to a movement along predetermined tracks.

10. The motor vehicle of claim 7, wherein the transmission device and the intermediate device comprise movable parts arranged for movement between different positions, and wherein a change in position of one of the movable parts corresponds essentially to a change in position of said at least two elements in relation to each other.

11. The motor vehicle of claim 4, wherein the performance-related condition is a mechanical play and the detector system comprises at least one play-detecting device operable to detect at least a part of said mechanical play.

12. The motor vehicle of claim 11, wherein at least part of said mechanical play occurs in at least one of the shifting device and the shift lever, and wherein the play-detecting device is operable to detect at least that part of the mechanical play that occurs in the shifting device.

13. The motor vehicle of claim 11, wherein at least part of said mechanical play occurs in at least one of the transmission device, the intermediate shifting device and the transmission-actuator device, and wherein the play-detecting device is operable to detect at least that part of the mechanical play that occurs in said at least one of the transmission device, the intermediate shifting device and the transmission-actuator device.

14. The motor vehicle of claim 11, further comprising at least one first element with a first reference location and at least one second element with a second reference location, wherein at least part of said mechanical play occurs between said first reference location and said second reference location and wherein the play-detecting device is operable to detect at least that part of the mechanical play that occurs between said first reference location and said second reference location.

15. The motor vehicle of claim 14, comprising at least one coupling device by which said first element and said second element are substantially coupled to each other at least partially and at least temporarily, said coupling device comprising linkage elements by which a first positional change of said first element is substantially correlated to a second positional change of said second element, said second positional change varying within a variation band width from a nominal amount of said second positional change.

16. The motor vehicle of claim 14, comprising at least one coupling device by which said first element and said second element are substantially coupled to each other at least partially and at least temporarily, wherein the first reference location and the second reference location are separated by a distance of variable length.

17. The motor vehicle of claim 14, wherein the first element belongs to the transmission device and the second element belongs to the shifting device.

18. The motor vehicle of claim 1, wherein the detector system comprises a strain-detection device to detect a strain of at least one component.

19. The motor vehicle of claim 18, wherein said at least one component is at least one of the following: an element of the shifting device, an element of the transmission device, an element of the intermediate shifting device, and a combination of at least two of said elements, wherein in the combination of at least two of said elements, the sum of the respective strains in said two elements in at least one orientation is detected by the strain-detecting device.

20. The motor vehicle of claim 1, wherein the detector system comprises a deformation-detecting device to detect a deformation of at least one component.

21. The motor vehicle of claim 20, wherein said at least one component is at least one of the following: an element of the shifting device, an element of the transmission device, an element of the intermediate shifting device, and a combination of at least two of said elements, wherein in the combination of at least two of said elements, the sum of the respective deformations in said two elements in at least one orientation is detected by the deformation-detecting device.

22. The motor vehicle of claim 4, wherein the performance-affecting condition is related to at least one of the following: a component of the vehicle, the shift signal and the shift lever input signal; and wherein the detector system evaluates the influence of the performance-affecting condition qualitatively.

23. The motor vehicle of claim 4, wherein the performance-affecting condition is related to at least one of the following: a component of the vehicle, the shift signal and the shift lever input signal; and wherein the detector system evaluates the influence of the performance-affecting condition quantitatively.

24. The motor vehicle of claim 4, wherein the performance-affecting condition comprises at least one of a play, a strain, and a deformation occurring during an operation of at least one of the vehicle, the shifting device, the transmission device, the intermediate shifting device, and the actuator device.

25. The motor vehicle of claim 1, wherein the at least one drive source comprises at least one motor.

26. The motor vehicle of claim 25, wherein the at least one motor comprises a combustion engine.

27. The motor vehicle of claim 1, wherein the at least one transmission device comprises a shiftable transmission.

28. The motor vehicle of claim 1, wherein the at least one transmission device comprises an at least partially automatic transmission.

29. The motor vehicle of claim 1, wherein the at least one transmission device comprises a continuously variable transmission.

30. The motor vehicle of claim 1, further comprising a torque-transmitting device.

31. The motor vehicle of claim 30, wherein the torque-transmitting device is arranged in the power train between the at least one drive source and the at least one transmission device.

32. The motor vehicle of claim 30, wherein the transmission device is arranged in the power train between the at least one drive source and the torque-transmitting device.

33. The motor vehicle of claim 4, wherein the shifting device is movable according to a shift pattern resembling the letter H.

34. The motor vehicle of claim 33, wherein the shift pattern has at least one shifting segment and at least a part of the shift lever is movable along the at least one shifting segment, whereby a shift into a gear level is initiated.

35. The motor vehicle of claim 34, wherein each of the at least two gear levels has its own shifting segment.

36. The motor vehicle of claim 34, wherein the shift pattern has at least one selecting segment and at least a part of the shift lever is movable along the at least one selecting segment, and wherein a shift into a gear level is substantially precluded while the shift lever is moving along the at least one selecting segment.

37. The motor vehicle of claim 36, wherein the at least one shifting segment is arranged substantially in a first orientation and the at least one selecting segment is arranged substantially in a second orientation different from said first orientation.

38. The motor vehicle of claim 37, comprising a plurality of shifting segments and a plurality of selecting segments, wherein all shifting segments are arranged exactly with a first orientation and all selecting segments are arranged exactly in a second orientation.

39. The motor vehicle of claim 38, wherein the first and second orientations are substantially perpendicular to each other.

40. The motor vehicle of claim 1, comprising at least one gear-level detecting device to detect which of the at least two gear levels is engaged and to detect whether the engaged gear level is a permissible gear level for the vehicle to take off from a stand-still condition.

41. The motor vehicle of claim 40, wherein the gear-level detecting device comprises at least one gear-level sensor device.

42. The motor vehicle of claim 4, comprising a shift-lever position detecting device to detect a current position of the shift lever.

43. The motor vehicle of claim 4, comprising a shift-lever displacement detecting device to detect a displacement of the shift lever in at least one dimension.

44. The motor vehicle of claim 36, wherein the shifting device comprises at least one shifting-device potentiometer.

45. The motor vehicle of claim 44, wherein the at least one shifting-device potentiometer comprises a linear potentiometer.

46. The motor vehicle of claim 4, comprising at least one shift-lever potentiometer for detecting a current position of the shift lever.

47. The motor vehicle of claim 46, wherein the at least one shift-lever potentiometer is at least part of the time connected to the shift lever.

48. The motor vehicle of claim 44, wherein the at least one shifting-device potentiometer comprises a shifting segment potentiometer for detecting a shift lever position in a lengthwise direction of the at least one shifting segment, and wherein the at least one shifting-device potentiometer further comprises a selecting segment potentiometer for detecting a shift lever position in a lengthwise direction of the at least one selecting segment.

49. The motor vehicle of claim 48, wherein the shift pattern comprises a plurality of shifting segments and each of the shifting segments is provided with a shifting segment potentiometer.

50. The motor vehicle of claim 44, wherein the at least one shifting-device potentiometer comprises a plurality of potentiometers having resistance/displacement characteristics that are at least in part identical.

51. The motor vehicle of claim 44, wherein the at least one shifting-device potentiometer comprises a plurality of potentiometers having resistance/displacement characteristics that are at least in part different from each other.

52. The motor vehicle of claim 51, comprising at least one potentiometer per shifting segment and at least one potentiometer per selecting segment, wherein potentiometers assigned to different segments have different resistance/displacement characteristics.

53. The motor vehicle of claim 1, comprising at least one control device for controlling the at least one detector system.

54. The motor vehicle of claim 2, comprising at least one processing and evaluating device, wherein the detector system sends measurement signals to the processing and evaluating device and the latter processes and evaluates said measurement signals, thereby producing measurement data from said measurement signals.

55. The motor vehicle of claim 54, comprising at least one data storage device for storing at least one of said measurement signals, said measurement data, and preset data used by the data storage device.

56. The motor vehicle of claim 54, wherein the processing and evaluating device comprises at least a part of a computer device.

57. The motor vehicle of claim 54, comprising at least one device for prescribing an operating phase.

58. The motor vehicle of claim 57, wherein said operating phase comprises a time period between starting and turning off the at least one drive source.

59. The motor vehicle of claim 54, wherein the processing and evaluating device is operable to process and evaluate the measurement signals according to different monitoring time segments, each monitoring time segment being started by a start signal and terminated by a stop signal.

60. The motor vehicle of claim 54, wherein the measurement signals relate to a performance-affecting condition and are processed and evaluated during the respective useful life of at least one of the motor vehicle and a component of the motor vehicle.

61. The motor vehicle of claim 59, comprising a comparator device for comparing measurement data of different monitoring time segments.

62. The motor vehicle of claim 61, wherein the monitoring time segments comprise short, intermediate, and long time periods.

63. The motor vehicle of claim 36, wherein the at least one intent-to-shift detection device generates at least part of the time a shift lever movement signal representing a movement of the shift lever along one of a shifting segment and a selecting segment.

64. The motor vehicle of claim 63, wherein the shift lever movement signal is of a proportionate magnitude as the movement of the shift lever.

65. The motor vehicle of claim 63, wherein the intent-to-shift detection device generates at least part of the time a filter signal that is dependent on the shift lever movement signal.

66. The motor vehicle of claim 65, wherein the filter signal is generated from the shift lever movement signal by one of an analog filter and a digital filter, and said filtered signal has a time lag relative to the shift lever movement signal.

67. The motor vehicle of claim 66, wherein the filter signal is linearized.

68. The motor vehicle of claim 67, wherein the time lag is adjustable.

69. The motor vehicle of claim 65, wherein the intent-to-shift detection device generates at least part of the time a reference signal, and wherein a relationship between time profiles of the reference signal and the shift lever movement signal is substantially indicative of an intent of a driver to shift gears.

70. The motor vehicle of claim 69, wherein the reference signal comprises, in summation, at least one of the filter signal, a constant value, and an offset signal.

71. The motor vehicle of claim 70, wherein at least one of the constant value and the offset signal is adjustable.

72. The motor vehicle of claim 71, wherein further at least one of the constant value and the offset signal is adaptable, and said adjustability and adaptability is available during a time phase when the vehicle is in operation.

73. The motor vehicle of claim 72, wherein the offset signal is dependent on a driving torque of the drive source.

74. The motor vehicle of claim 70, wherein an oscillation occurring typically-in the operation of the shift lever can at least in part cause a cross-over between time profiles of the shift lever movement signal and the reference, and said cross-over is prevented by an appropriate choice of the constant value.

75. The motor vehicle of claim 70, wherein the shifting device comprises a rod mechanism and said constant value is dependent on an elasticity of the rod mechanism.

76. The motor vehicle of claim 65, wherein the intent-to-shift detection device detects time profiles of at least one of the shift lever movement signal, the filter signal, and the reference signal.

77. The motor vehicle of claim 65, wherein at least one of the filter signal and the reference signal follows the shift lever movement signal with a time lag.

78. The motor vehicle of claim 76, wherein the intent-to-shift detecting device generates an intent-to-shift signal, detects whether or not predetermined criteria are met, and if said criteria are met, transmits the intent-to-shift signal to the at least one transmission-actuator device.

79. The motor vehicle of claim 78, wherein the predetermined criteria comprise a condition that a cross-over has been detected between the time profile of the shift lever movement signal and the time profile of the reference signal.

80. The motor vehicle of claim 79, wherein the predetermined criteria comprise a further condition that a predetermined time interval has elapsed since the detection of the cross-over.

81. The motor vehicle of claim 80, wherein the predetermined criteria comprise a third condition that no control signal contradicting the intent-to-shift signal has been received during the predetermined time interval.

82. The motor vehicle of claim 81, comprising at least one control-signal generating device connected to at least one of a data-generating sensor and a computing device providing data on at least one influence factor, said influence factor comprising at least one of the drive torque, a connected load, and a further time profile of the movement of the shift lever.

83. The motor vehicle of claim 81, comprising a shift lever speed determining device to determine a speed of the shift lever moving along at least one of the shifting and selecting segments.

84. The motor vehicle of claim 81, comprising a shift lever acceleration determining device to determine an acceleration of the shift lever moving along at least one of the shifting and selecting segments.

85. The motor vehicle of claim 84, wherein the predetermined criteria comprise a fourth condition that the shift lever is being moved along at least one of a shifting segment and a selecting segment while at least one of the speed and acceleration of the shift lever is less than a predetermined value.

86. The motor vehicle of claim 84, wherein at least one of the shift lever position, shift lever movement, shift lever speed, and shift lever acceleration is determined in at least one substantially force free position of at least one of a group of transmission elements consisting of the shift lever and at least one component coupled to the shift lever.

87. The motor vehicle of claim 86, wherein the transmission device further comprises a shift-position detent device to releasably hold said at least one component in the force-free position.

88. The motor vehicle of claim 84, wherein data describing at least one of the shift lever position and shift lever movement are assigned to a group among a plurality of groups of data in accordance with a predetermined group-assignment characteristic.

89. The motor vehicle of claim 88, wherein the predetermined group-assignment characteristic comprises a selection characteristic to distinguish between data of at least one first group meeting first predetermined criteria and at least one second group meeting second predetermined criteria.

90. The motor vehicle of claim 89, wherein at least one predetermined criterion for the data of the at least one first group is to represent minimum values and for the data of the at least one second group to represent maximum values.

91. The motor vehicle of claim 90, wherein at least one of said first and second groups of data is assigned to at least one shifting segment.

92. The motor vehicle of claim 90, wherein the shifting pattern comprises a plurality of shifting segments, wherein at least one of said first and second groups of data exists for each shifting segment.

93. The motor vehicle of claim 88, wherein the shift lever has at least one force-free position, and the predetermined group-assignment characteristic comprises a selection characteristic to select data representing extremes of said at least one force-free position.

94. The motor vehicle of claim 89, wherein the shift lever has at least one force-free position, and at least one predetermined criterion for the data of the at least one first group is to represent minimum values of said force-free position and for the data of the at least one second group to represent maximum values of said force-free position.

95. The motor vehicle of claim 89, wherein at least one of the shift lever and a component coupled to the shift lever can be set to a plurality of gear levels including a neutral gear level, each of the gear levels has a force-free position, and at least one predetermined criterion for the data of the at least one first group is to represent minimum values of at least one of said force-free positions, and for the data of the at least one second group to represent maximum values of at least one of said force-free positions.

96. The motor vehicle of claim 89, wherein the shift lever can be set to at least a first predefined gear level with a first force-free position and a second predefined gear level with a second force-free position, said first and second predetermined gear levels representing a gear-level pair, and at least one predetermined criterion for the data of the at least one first group is to represent minimum differences between the respective values of said first force-free position and said second force-free position, and for the data of the at least one second group to represent maximum differences between the respective values of said first force-free position and said second force-free position.

97. The motor vehicle of claim 89, wherein the shift lever can be set to a plurality of predefined gear levels arranged in a plurality of gear-level pairs, each gear level having a force-free position, at least one of the plurality of gear-level pairs is assigned at least one first group and at least one second group of data, and at least one predetermined criterion for the data of the at least one first group is to represent minimum differences between the respective values of the force-free positions of the gear levels in said at least one gear-level pair and said second force-free position, and for the data of the at least one second group to represent maximum differences between the respective values of the force-free positions of the gear levels in said at least one gear-level pair.

98. The motor vehicle of claim 88, wherein the predetermined group-assignment characteristic comprises a selection characteristic performing at least one of the functions of selecting individual data values that are to be processed and rejecting individual data values that are not to be processed.

99. The motor vehicle of claim 98, wherein the selection characteristic performs the function of selecting individual data values that are to be processed.

100. The motor vehicle of claim 99, wherein the selection characteristic selects individual data values meeting at least one predetermined selection criterion.

101. The motor vehicle of claim 100, wherein the predetermined selection criterion requires that an individual data value be within a predetermined range in order to be selected.

102. The motor vehicle of claim 100, wherein the selection characteristic selects individual data values if they deviate by no more than a predetermined deviation amount from a range of the data values previously assigned to the same group.

103. The motor vehicle of claim 100, wherein the selection characteristic selects individual data values if they deviate by no more than a predetermined deviation amount from an average of the data values previously assigned to the same group.

104. The motor vehicle of claim 103, wherein the average is defined as the quotient of the sum of the data values divided by the count of the data values previously assigned to the same group.

105. The motor vehicle of claim 103, wherein the average is defined as a weighted average calculated according to a predetermined weight function.

106. The motor vehicle of claim 88, comprising a group data storage device, wherein the data values assigned to the groups are stored for reference purposes.

107. The motor vehicle of claim 106, wherein the data values stored in the group data storage device are erased at certain points in time.

108. The motor vehicle of claim 107, further comprising a long-term group data storage device, wherein data values to be erased from the group data storage device are transferred to the long-term group data storage device.

109. The motor vehicle of claim 88, further comprising a noise-eliminating device to eliminate noise from series of said data values.

110. The motor vehicle of claim 109, wherein the noise-eliminating device determines averages based on pluralities of values.

111. The motor vehicle of claim 110, wherein each of the averages is based on a plurality of values that are assigned to one group.

112. The motor vehicle of claim 110, wherein each of the averages is defined as the quotient of the sum of the data values divided by the count of the data values belonging to said plurality of values.

113. The motor vehicle of claim 110, wherein the average is defined as a weighted average calculated according to a predetermined weight function.

114. The motor vehicle of claim 110, wherein at least one of the groups has at least one subgroup, said at least one of the groups and said at least one subgroup have substantially the same group-assignment criteria, wherein each of the averages is based on a plurality of values that are assigned to one subgroup.

115. The motor vehicle of claim 114, further comprising a subgroup data storage device, wherein averages of data values assigned to subgroups are stored at least in part and at least part of the time in the subgroup data storage device.

116. The motor vehicle of claim 115, wherein the data values stored in the subgroup data storage device are erased at certain points in time.

117. The motor vehicle of claim 116, further comprising a long-term subgroup data storage device, wherein data values to be erased from the subgroup data storage device are transferred to the long-term subgroup data storage device.

118. The motor vehicle of claim 110, wherein a majority of individual data values used in calculating an average are selected according to a predetermined selection characteristic.

119. The motor vehicle of claim 110, wherein the count of how many individual data values are to be used in calculating an average is selected according to a predetermined selection characteristic.

120. The motor vehicle of claim 110, wherein an average is calculated based on at least two individual data values.

121. The motor vehicle of claim 120, wherein an average is calculated based on ten individual data values.

122. The motor vehicle of claim 120, wherein an average is calculated based on a series of individual data values that have been determined substantially in immediate succession of each other, and wherein said series of individual data values represents measuring signals detected in one and the same force-free position of at least one of the shift lever and a component coupled to the shift lever.

123. The motor vehicle of claim 109, wherein the noise-eliminating device comprises an average-selection characteristic for selecting individual data values to be used in calculating an average.

124. The motor vehicle of claim 123, wherein the average-selection characteristic selects data values meeting at least one predetermined selection criterion.

125. The motor vehicle of claim 124, wherein the at least one predetermined selection criterion requires that an individual data value be within a predetermined range in order to be selected.

126. The motor vehicle of claim 124, wherein the at least one selection criterion requires that individual data values deviate by no more than a predetermined deviation amount from a range of the data values previously assigned to the same group and, if the group has subgroups, to the same subgroup.

127. The motor vehicle of claim 124, wherein the at least one selection criterion requires that at least one of the largest data value and the smallest data value selected for calculating an average be disregarded in calculating said average.

128. The motor vehicle of claim 124, wherein the at least one selection criterion requires that individual data values deviate by no more than a predetermined deviation amount from an overall average of all of the data values previously assigned to the same group and, if the group has subgroups, to the same subgroup.

129. The motor vehicle of claim 128, wherein said overall average is defined as the quotient of the sum of the data values divided by the count of the data values previously assigned to the same group and, if the group has subgroups, to the same subgroup.

130. The motor vehicle of claim 129, wherein the overall average is calculated as a weighted average, according to a predetermined weigh function, of all of the averages previously assigned to the same group and, if the group has subgroups, to the same subgroup.

131. The motor vehicle of claim 111, wherein the averages are moving averages based on the most recently selected data values of a group.

132. The motor vehicle of claim 88, comprising at least one max/min data storage device to store maxima and minima of individual values and average values for each of the groups and, if applicable, subgroups.

133. The motor vehicle of claim 132, wherein a stored maximum value in the at least one max/min data storage device is replaced by a new, larger maximum value, if said new, larger maximum value deviates from said stored maximum value by no more than a predetermined maximum increase.

134. The motor vehicle of claim 132, wherein a stored minimum value in the at least one max/min data storage device is replaced by a new, smaller minimum value, if said new, smaller minimum value deviates from said stored minimum value by no more than a predetermined maximum decrease.

135. The motor vehicle of claim 132, wherein said individual values are measured in increments of substantially 0.4 millimeters; wherein a stored maximum value in the at least one max/min data storage device is replaced by a new, larger maximum value, if said new, larger maximum value deviates from said stored maximum value by no than one increment, and wherein a stored minimum value in the at least one max/min data storage device is replaced by a new, smaller minimum value, if said new, smaller minimum value deviates from said stored minimum value by no more than one increment.

136. The motor vehicle of claim 132, wherein a stored minimum value in the at least one max/min data storage device is replaced by a new, smaller minimum value, if said new, smaller minimum value is one of an individual value and an average of individual values; and if the individual values are being determined at a time when the transmission device is operating at a gear level other than neutral, a transmission sensor signal representing a shift lever movement deviates from a nominal position by no more than a predetermined maximum allowable deviation, and the speed of said shift lever movement is substantially zero.

137. The motor vehicle of claim 132, wherein a stored minimum value in the at least one max/min data storage device is replaced by a new, smaller minimum value, if said new, smaller minimum value is one of an individual value and an average of individual values; and if the individual values are being determined at a time when the transmission device is operating at the neutral gear level, a transmission sensor signal representing a shift lever movement deviates from a nominal position by no more than a predetermined maximum allowable deviation, and the speed of said shift lever movement is substantially zero.

138. The motor vehicle of claim 132, wherein said individual values are measured in increments of substantially 0.4 millimeters, and wherein a stored minimum value in the at least one max/min data storage device is replaced by a new, smaller minimum value, if said new, smaller minimum value is one of an individual value and an average of individual values; if the individual values are being determined at a time when a transmission sensor signal representing a shift lever movement deviates from a nominal position by no more than three increments; and when the speed of said shift lever movement is substantially zero.

139. The motor vehicle of claim 11, wherein the play-detecting device determines an amount of play of an element of the transmission device based on maximum and minimum values.

140. The motor vehicle of claim 139, wherein said element of the transmission device comprises the shift lever.

141. The motor vehicle of claim 140, wherein said amount of play is defined as one-half of the difference between the maximum and minimum values.

142. The motor vehicle of claim 141, wherein the maximum and minimum values belong to the same position of the shift lever when the latter is positioned in a substantially force-free condition at one of the gear levels, said gear levels including the neutral level.

143. The motor vehicle of claim 140, wherein the play-detecting device determines the amount of play for at least two gear levels.

144. The motor vehicle of claim 143, wherein said at least two gear levels comprise all gear levels of the transmission, excluding the neutral gear level.

145. The motor vehicle of claim 144, wherein the play-detecting device further determines an absolute amount of play, said absolute amount being the maximum of the amounts of play determined in said at least two gear levels.

146. The motor vehicle of claim 11, wherein the intent-to-shift detecting device is at least part of the time operable to perform one of a detection, an adjustment, and an optimization of at least one of an offset signal and a reference signal according to a prescribed characteristic based on at least a part a set of data values from the group consisting of individually detected values, average values, values representing amounts of play, and averages of values representing amounts of play.

147. The motor vehicle of claim 146, wherein the intent-to shift detecting device generates at least part of the time a reference signal dependent on at least one data value representing an amount of play.

148. The motor vehicle of claim 147, wherein said at least one data value depends on an amount of play of the shift lever with regard to at least one gear level.

149. The motor vehicle of claim 146, wherein the reference signal is dependent on an absolute amount of play, said absolute amount being the maximum of the amounts of play of the shift lever over all of the gear levels.

150. The motor vehicle of claim 146, wherein the intent-to-shift detecting device is at least part of the time operable to generate an offset signal dependent on an amount of play of the shift lever in a substantially force-free condition in at least one gear level, said at least one gear level including the neutral gear level.

151. The motor vehicle of claim 146, wherein the intent-to-shift detecting device is at least part of the time operable to generate an offset signal dependent on an absolute amount of play, said absolute amount being the maximum of the amounts of play of the shift lever over all of the gear levels.

152. The motor vehicle of claim 146, wherein the intent-to-shift detecting device is at least part of the time operable to generate one of an offset signal, a constant value and a reference signal dependent on at least one of the following: an absolute amount of play of the shift lever, an amount of play of the shift lever related to a gear level, an amount of play of the shift lever related to the neutral gear level, a substantially force-free position, and an amount of play occurring dynamically while the motor vehicle is in operation.

153. A method of detecting an intent to shift of a driver in a vehicle with at least one transmission device and at least one shifting device, said method comprising the step of determining the intent to shift in accordance with a prescribed detection characteristic, wherein the detection characteristic gives at least partial weight to an amount of play existing in at least one of the transmission device and the shifting device.

* * * * *

UNITED STATES PATENT AND TRADEMARK OFFICE
CERTIFICATE OF CORRECTION

PATENT NO.     : 6,411,879 B2
DATED          : June 25, 2002
INVENTOR(S)    : Klaus Kupper and Michael Salecker It is certified that error appears in the above-identified patent and that said Letters Patent is hereby corrected as shown below:

<u>Title page,</u>
Item [63], Related U.S. Application Data, delete "Dec. 28, 1999" and substitute -- Oct. 28, 1999 --

Signed and Sealed this

First Day of July, 2003

JAMES E. ROGAN
*Director of the United States Patent and Trademark Office*